US008111938B2

(12) United States Patent
Bryll et al.

(10) Patent No.: US 8,111,938 B2
(45) Date of Patent: Feb. 7, 2012

(54) SYSTEM AND METHOD FOR FAST APPROXIMATE FOCUS

(75) Inventors: Robert K. Bryll, Bothell, WA (US); Michael Nahum, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 552 days.

(21) Appl. No.: 12/343,383

(22) Filed: Dec. 23, 2008

(65) Prior Publication Data

US 2010/0158343 A1    Jun. 24, 2010

(51) Int. Cl.
*G06K 9/40* (2006.01)
(52) U.S. Cl. ........................................................ 382/255
(58) Field of Classification Search .................. 382/255; 348/349
See application file for complete search history.

(56) References Cited

U.S. PATENT DOCUMENTS

| | | | |
|---|---|---|---|
| 4,967,280 A * | 10/1990 | Takuma et al. | 250/201.2 |
| 5,200,828 A | 4/1993 | Jang | |
| 5,398,096 A | 3/1995 | Yagoto | |
| 5,790,710 A | 8/1998 | Price | |
| 5,892,218 A | 4/1999 | Ortyn | |
| 5,932,872 A * | 8/1999 | Price | 250/201.3 |
| 6,542,180 B1 | 4/2003 | Wasserman | |
| 6,608,705 B1 | 8/2003 | Oshima | |
| 6,975,810 B2 | 12/2005 | Iwane | |
| 7,030,351 B2 | 4/2006 | Wasserman | |
| 7,034,883 B1 * | 4/2006 | Rosenqvist | 348/345 |
| 7,324,682 B2 | 1/2008 | Wasserman | |
| 7,454,053 B2 | 11/2008 | Bryll | |
| 2003/0197925 A1 | 10/2003 | Hamborg | |
| 2005/0031191 A1 | 2/2005 | Venkatachalam | |
| 2005/0109959 A1 * | 5/2005 | Wasserman et al. | 250/201.2 |
| 2006/0001955 A1 | 1/2006 | Kinney | |
| 2006/0012836 A1 | 1/2006 | Boemler | |
| 2006/0093205 A1 * | 5/2006 | Bryll et al. | 382/152 |
| 2008/0069553 A1 * | 3/2008 | Li et al. | 348/349 |
| 2010/0157086 A1 * | 6/2010 | Segale et al. | 382/255 |

FOREIGN PATENT DOCUMENTS

EP    1 381 229 A1    1/2004
(Continued)

OTHER PUBLICATIONS

Geusebroek, J.-M., et al., "Robust Autofocusing in Microscopy," ISIS Technical Report Series, vol. 17, Intelligent Sensory Information Systems Group, University of Amsterdam, Nov. 2000, 20 pages.

(Continued)

*Primary Examiner* — Kara E Geisel
(74) *Attorney, Agent, or Firm* — Christensen O'Connor Johnson Kindness PLLC

(57) ABSTRACT

Fast approximate focus operations providing an approximately focused image that is sufficiently focused to support certain subsequent inspection operations. The operations are particularly advantageous when used to provide images for successive inspection operations that predominate when inspecting planar workpieces. Improved inspection throughput is provided because, in contrast to conventional autofocus operations, the fast approximate focus operations do not acquire an image stack during a run mode as a basis for determining a best focused image. Rather, during learn mode, a representative feature-specific focus curve and a focus threshold value are determined and used during run mode to provide an approximately focused image that reliably supports certain inspection operations. In one embodiment, an acceptable approximately focused inspection image is provided within a limit of two focus adjustment moves that provide two corresponding images. The adjustment moves are based on the representative feature-specific focus curve provided in learn mode.

20 Claims, 11 Drawing Sheets

FOREIGN PATENT DOCUMENTS

WO 00/75709 A1 12/2000

OTHER PUBLICATIONS

"QVPAK 3D CNC Vision Measuring Machine: Operating Guide," Version 2.0, Manual No. 4911GB, Series No. 359, Mitutoyo Corporation & Micro Encoder Inc., Kanagawa, Japan, Sep. 1996.

"QVPAK 3D CNC Vision Measuring Machine: User's Guide," Version 7.1, 2d ed., Manual No. 99MCB225A1, Series No. 359, Mitutoyo Corporation & Micro Encoder Inc., Kanagawa, Japan, Sep. 2003.

West, P.C., "High Speed, Real-Time Machine Vision," CyberOptics—Imagenation, Portland, Ore., 2001, 39 pages.

* cited by examiner

SYSTEM AND METHOD FOR FAST APPROXIMATE FOCUS

FIELD OF THE INVENTION

The invention relates generally to machine vision inspection systems, and more particularly to systems and methods for automatically focusing a machine vision inspection system.

BACKGROUND OF THE INVENTION

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions to allow workpiece inspection. One exemplary prior art system, that can be characterized as a general-purpose "off-line" precision vision system, is the commercially available QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the *QVPAK 3D CNC Vision Measuring Machine User's Guide*, published January 2003, and the *QVPAK 3D CNC Vision Measuring Machine Operation Guide*, published September 1996, each of which is hereby incorporated by reference in their entirety. This type of system is able to use a microscope-type optical system and move the stage so as to provide inspection images either small or relatively large workpieces at various magnifications.

General purpose precision machine vision inspection systems, such as the QUICK VISION™ system, are also generally programmable to provide automated video inspection. Such systems typically include GUI features and predefined image analysis "video tools" such that operation and programming can be performed by "non-expert" operators. For example, U.S. Pat. No. 6,542,180 (hereinafter "the '180 patent"), which is incorporated herein by reference in its entirety, teaches a vision system that uses automated video inspection.

As taught in the '180 patent, automated video inspection metrology instruments generally have a programming capability that allows an automatic inspection event sequence to be defined by the user for each particular workpiece configuration. Such programming can be implemented as text-based programming, or through a recording mode that progressively "learns" the inspection event sequence by storing a sequence of machine control instructions corresponding to a sequence of inspection operations performed by a user, or through a combination of both methods. Such a recording mode is often referred to as "learn mode" or "training mode." In either technique, the machine control instructions are generally stored as a part program that is specific to the particular workpiece configuration, and automatically performs a predetermined sequence of inspection operations during a "run mode" of operation.

In general, during a known sequence of autofocus operations the camera moves through a range of positions along a Z-axis and captures an image at each position. For each captured image, a focus metric is calculated and related to the corresponding position of the camera along the Z-axis at the time that the image was captured. One known method of autofocusing is discussed in "Robust Autofocusing in Microscopy," by Jan-Mark Geusebroek and Arnold Smeulders in ISIS Technical Report Series, Vol. 17, November 2000, which is incorporated herein by reference, in its entirety. In order to determine a Z-axis position of the camera that corresponds to an autofocus image, the discussed method estimates a position of the camera along a Z-axis based on a measured amount of time during which the camera moves from a known original position on the Z-axis at a constant velocity along the Z-axis, until the image is acquired. During the constant velocity motion, the autofocus images are captured at 40 ms intervals (video rate). The disclosed method teaches that the video hardware captures frames at a fixed rate, and that the sampling density of the focusing curve can be influenced by adjusting the stage velocity. Another known autofocus method and apparatus is described in U.S. Pat. No. 5,790,710 (hereinafter "the '710 patent"), which is incorporated herein by reference, in its entirety. In the '710 patent a piezoelectric positioner is utilized in conjunction with a conventional motor-driven motion control system to control the Z-axis position motion while acquiring autofocus images. Another improved autofocus system and method is described in U.S. Pat. No. 7,030,351, which is commonly assigned and hereby incorporated by reference, in its entirety. In all these cases, a relatively large number of images are acquired during run mode as a basis for autofocusing prior to acquiring inspection images. Due to increasing computation speeds, computation speeds are becoming less relevant to inspection throughput, while the physical movements required for the systems and methods referred to above generally remain as a primary factor limiting inspection throughput. An autofocus system and method that can further improve throughput is desirable.

The present invention is directed to a system and method for providing inspection images at an improved rate. More specifically, a system and method are provided for quickly adjusting to acceptable approximate focus positions using a limited amount of physical movement.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In contrast to each of the previously described known systems and methods for performing autofocus operations, the present invention provides improved inspection throughput by using fast approximate autofocusing suitable for certain operations in a general purpose precision machine vision inspection system. The terms "fast approximate autofocusing" and "fast approximate focusing" are generally used interchangeably herein, and may be taken to mean the same thing unless otherwise indicated. Some advantageous features of the methods include that they may be implemented to improve throughput for machines already in the field, and that they do not require a special focus sensor. According to one aspect of the invention, a general method is provided for implementing fast approximate autofocus operations during learn mode (e.g., in one embodiment by training a fast approximate autofocus video tool). In general, a set of learn mode operations are provided for determining a representative focus curve and a related focus threshold value, given an image of a representative region of interest (ROI). In one embodiment, learn mode fast approximate autofocus learning or "tool training" operations include acquiring a representative image of the representative region of interest. The region of interest may be defined using a video tool user interface, for example, and generally includes a representative feature to be inspected. For the purposes of creating a part program, the representative feature represents corresponding features on other workpieces. Then, a representative feature-specific focus curve is determined for the region of interest (ROI). The feature-specific focus curve, which characterizes image focus for the ROI as a function of the Z-coordinate used for imaging, may be determined by conventional methods during learn mode. Then, a focus threshold value, corresponding to a level of "approximate focus" that is sufficient for supporting the desired feature inspection operations, is determined and/or learned. (In this context, "learned" may mean determined and recorded, in some form, in a part program (e.g., as a video tool parameter) as a basis for later automatic inspection of corresponding features.) More generally, the determined and/or learned representative feature-specific focus curve data and/or the focus threshold value data may be characterized and recorded in any convenient form. In one embodiment, the "curve data" may correspond to a conventional form of a focus curve, and the "value data" may correspond to a standard threshold value. In other embodiments, the curve data may correspond to other types of data, such as a dense focus curve "F-Z" lookup table, coefficients that customize a nominal analytical curve shape, a pruned lookup table, etc. Similarly, in other embodiments the threshold data may correspond to other types of data, such as "depth of field (DOF) units" that are used cooperatively with the curve data to compute the numerical value at run mode, a numerical value computed and stored at learn time, a multiplication factor (e.g., a fraction) for the focus curve peak height, etc.

In accordance with another aspect of the invention, a general method for implementing fast approximate autofocus operations during run mode (e.g., by executing the operations of a fast approximate autofocus video tool) is provided. In general, a set of run mode operations are provided for employing representative focus curve data and focus threshold value data to confirm or provide a fast approximate focus for an image to be used for inspecting a workpiece feature. In general, the representative focus curve data and focus threshold value data will have been previously established for a corresponding feature in a corresponding workpiece, such as during a learn mode. Such use of a fast approximate focus provides an acceptable level of accuracy in many applications where the inspection operation does not require accurate Z coordinate data. For example, using appropriate image processing, various XY edge location measurements may remain relatively accurate and repeatable even when they are determined from an inspection image which includes image blur (e.g., an image that is only approximately in focus).

In one embodiment, run mode fast approximate autofocus operations include acquiring a first image of the region of interest including the feature to be inspected. Then, previously learned representative feature-specific focus curve data and focus threshold value data corresponding to the current region of interest and feature to be inspected are accessed. A first image focus value is then determined for the current region of interest, and a determination is made as to whether the first image focus value is greater than the focus threshold value. If the first image focus value is greater than the focus threshold value, then feature inspection operations are performed in the current image, and if not, then a Z axis movement is made in a primary adjustment direction for an estimated primary adjustment distance to a peak focus Z height, wherein the primary adjustment distance is estimated based on the representative feature-specific focus curve data and the first image focus value. At the estimated primary adjustment distance, a second image is acquired and a second image focus value is determined for the region of interest. In one embodiment, a determination is then made as to whether the second image focus value is worse than the first image focus value. If it is determined that the second image focus value is not worse than the first image focus value, then, in one embodiment, feature inspection operations are performed in the current image. If the second image focus value is worse than the first, then a Z axis movement is made in a direction that is opposite to the primary adjustment direction, for an estimated secondary adjustment distance to a peak focus Z height, wherein the secondary adjustment distance is estimated based on at least one of the primary adjustment distance and the representative feature-specific focus curve data. At the estimated secondary adjustment distance a third image is acquired and feature inspection operations are then performed in the current image (the third image). In one embodiment, the secondary adjustment distance is approximately 2× the primary adjustment distance.

In accordance with another aspect of the invention, an augmented implementation of the fast approximate focus learn mode may be utilized. In the augmented implementation, a representative workpiece is provided in an operable position for inspection, and a first/next representative feature to be inspected is positioned in the field of view, wherein the representative feature represents corresponding features on other workpieces, and an image is acquired. A determination is then made as to whether fast approximate focus will be used (e.g., based on user input). If it is determined that fast approximate focus will not be used, then other feature inspection operations are defined. If fast approximate focus will be used, then a fast approximate autofocus tool is selected (e.g., by a user, using a graphical user interface). Once the tool is selected, it may be used to define a region of interest (ROI) including the representative feature, and a representative feature-specific focus curve may be determined for the region of interest (ROI), as outlined above. Then, a focus threshold value, corresponding to a level of "approximate focus" that is sufficient for supporting the desired feature inspection operations, is determined. In one embodiment, the user may operate the vision machine to provide an image that is defocused to a level they judge to be the worst focus they find acceptable. In one embodiment, they determine this subjectively, by viewing the image. In another embodiment, they determine this by performing inspection operations at varied focus levels, and evaluating the accuracy and/or repeatability of the results compared to the results from a well focused image. The focus threshold value may alternatively be determined automatically. For example, in some embodiments, this may be done by determining the focus value that corresponds to a predetermined number of increments of the depth of focus of the current optical system away from the focus peak location, on the representative feature-specific focus curve. Fast approximate autofocus tool data and/or parameters are then recorded, including the representative feature-specific focus curve data and the focus threshold value data, in association with a part program. Next, the feature inspection operations which are to be performed in the region of interest are defined. If there are more features to be inspected, then the routine is repeated for the next feature. However, in an alternative embodiment of the routine, operations are included such that if the additional features are substantially similar to the current feature, then the operations at block 740 that determine the representative feature-specific focus curve and representative focus threshold value are replaced by operations that determine the substantial similarity (e.g., based on user input, or feature recognition, etc.) and then reuse the previously determined representative feature-specific focus curve and representative focus threshold value that were determined for the substantially similar feature.

In accordance with another aspect of the invention, an augmented implementation of fast approximate focus may be used in run mode, for example, as follows. At the start of run mode, a part program is provided, along with a workpiece in position for inspection. The part program is started, and the first/next tool is determined and the first/next feature (to be inspected) is positioned in the field of view. If the fast approximate autofocus tool is being used, then representative feature-specific focus curve data and focus threshold value data are accessed, corresponding to the current feature. A first image is then acquired and a first image focus value is determined in the region of interest defined by the tool, and a determination is made as to whether the first image focus value is greater than the focus threshold value. If the first image focus value is greater than the focus threshold value, then feature inspection operations are begun. If the first image focus value isn't greater, then a primary adjustment distance is estimated to a peak focus Z height based on the representative feature-specific focus curve data and the first image focus value. The vision machine is then moved to adjust the Z height by the primary adjustment distance, in a primary adjustment direction (e.g., to increase Z), and thereafter a second image is acquired and a second image focus value is determined for the region of interest. A determination is then made as to whether the second image focus value is greater than the focus threshold value. If the second image focus value is greater than the focus threshold value, then feature inspection operations are begun, and if it isn't greater then a determination is further made as to whether the second image focus value is greater than the first image focus value. If the second image focus value is greater than the first image focus value, then this indicates that the primary adjustment direction was proper, but the primary adjustment distance was not. Therefore, in one embodiment, the fast approximate focus operations call or execute default autofocus operations (e.g., conventional operations such as acquiring additional images, determining a new focus curve, finding its peak, etc). Such operations are slower, but more robust. In another embodiment, the autofocus operations may be terminated, and an error indication may be output. In another embodiment, one or more additional pre-computed adjustments may be performed, depending on the shape of the contrast curve. If the second image focus value is not greater than the first image focus value, then a secondary adjustment distance is determined and the vision machine is moved in an "opposite adjustment" direction that is opposite to the primary adjustment direction, to adjust the Z height by the secondary adjustment distance. The secondary adjustment distance is determined based on at least one of the primary adjustment distance and the representative feature-specific focus curve data. For example, in one embodiment the secondary adjustment distance is determined as approximately two times the primary adjustment distance. In another embodiment, the secondary adjustment distance is determined independently of the primary adjustment distance, but in the same manner. A third image is then acquired and a third image focus value is determined in the region of interest, and a determination is made as to whether the third image focus value is greater than the focus threshold value. If the third image focus value is not greater than the focus threshold value, then the fast approximate focus operations call or execute default autofocus operations (e.g., as described above), and if it is greater then feature inspection operations are performed in the current image. In one embodiment, the fast approximate focus operations may (optionally) have an additional aspect, wherein under some circumstances the last successful plus or minus Z adjustment direction may be recorded and/or used as the primary adjustment direction in a subsequent next instance of performing the fast approximate autofocus operations, for a next feature to be inspected. If there are more features to inspect, then the routine starts again with the next feature, or else the inspection results are stored/output and/or the part program is ended.

It should be appreciated that performing a subsequent adjustment or search in the same direction as the last (previous) successful adjustment direction is advantageous when a part that is being inspected is nominally flat (or nearly so), but is tilted or warped on the stage of the machine vision system. When inspecting an array of features on such parts (e.g., printed circuit board holes), the slope is likely to be consistent, or at least slowly changing, such that an a focus adjustment direction that was successful during the inspection of the previous workpiece feature will likely be the correct focus adjustment direction for the next workpiece feature. Therefore, this method is likely to improve or maximize throughput when inspecting such workpieces.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
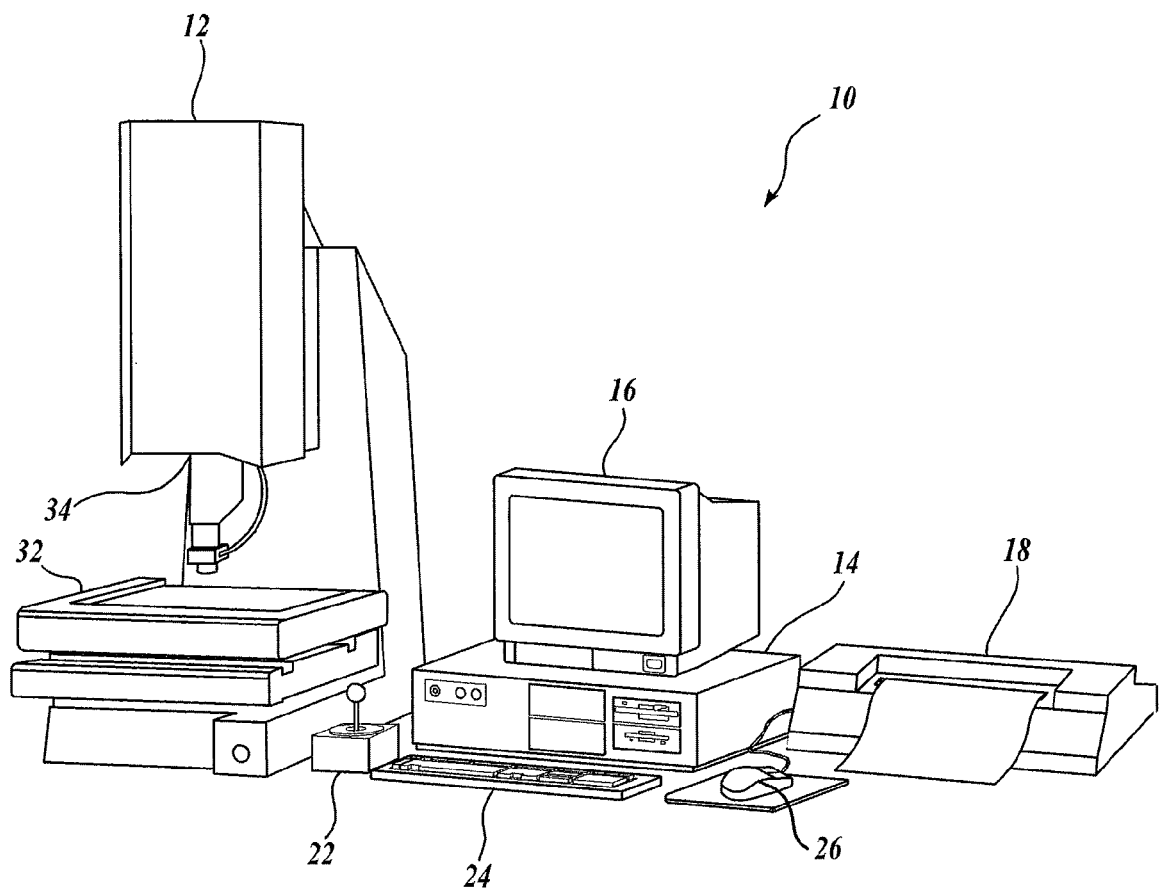
FIG. 1 is a diagram showing various typical components of a general purpose precision machine vision inspection system.

FIG. 1 is a block diagram of one exemplary machine vision inspection system 10 usable in accordance with the present invention. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in commonly assigned U.S. Pat. No. 7,454,053, which is hereby incorporated herein by reference in its entirety. Various aspects of vision measuring machines and control systems are also described in more detail in copending and commonly assigned U.S. patent application Ser. No. 10/632,823, filed Aug. 4, 2003, and U.S. Pat. No. 7,324,682, filed Mar. 25, 2004, which are also hereby incorporated herein by reference in their entirety. The fast approximate focus operations disclosed herein can dramatically increase throughput for some applications of machine vision inspection systems. Furthermore, the methods may be implemented as an easy to use video tool and/or autofocus mode of operation.

Figure 2:
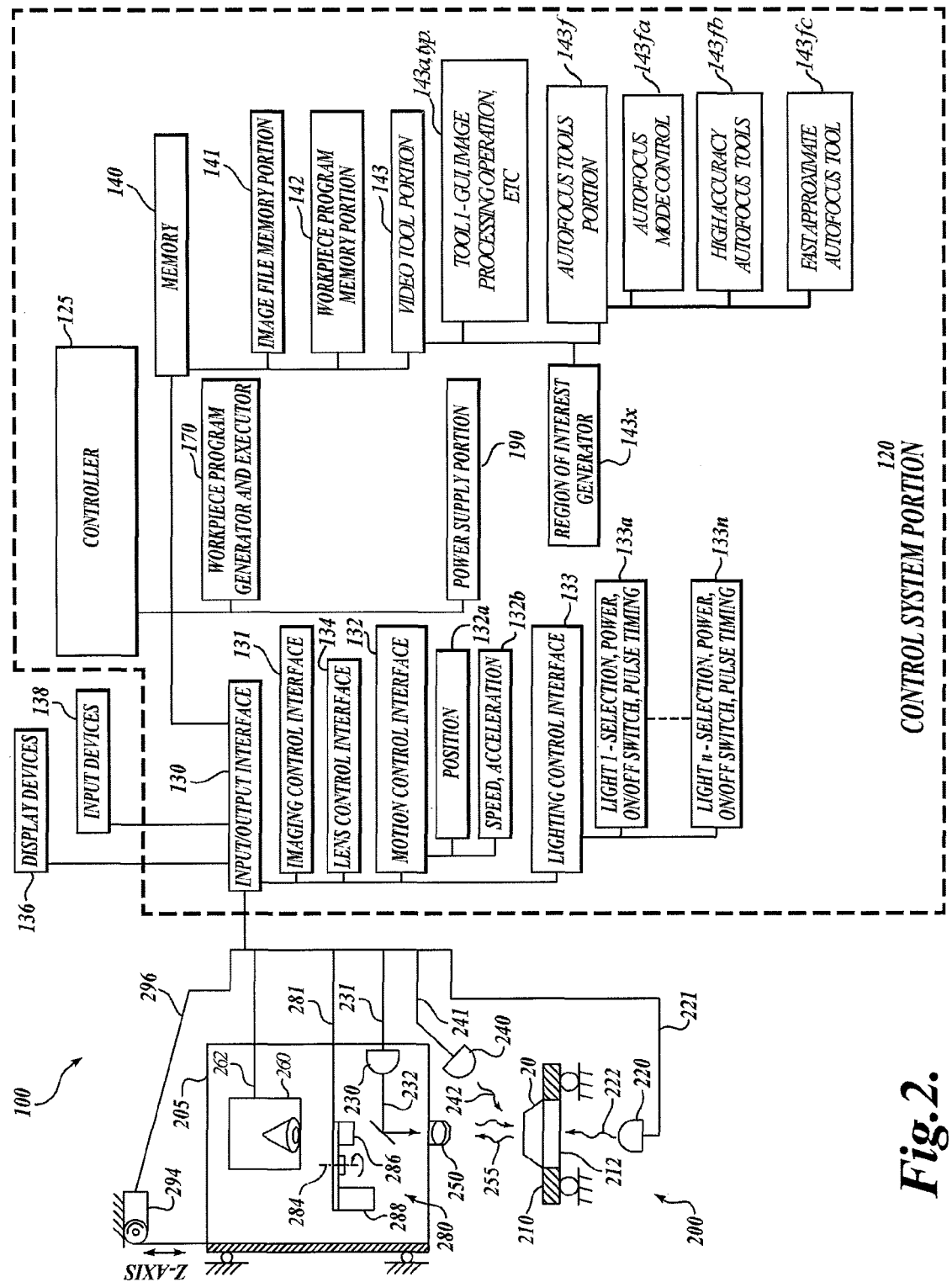
FIG. 2 is a diagram of a control system portion and a vision components portion of a machine vision inspection system.

FIG. 2 is a diagram of a control system portion 120 and a vision components portion 200 of a machine vision inspection system 100 in accordance with the present invention. As will be described in more detail below, the control system portion 120 is utilized to control the vision components portion 200. The vision components portion 200 includes an optical assembly portion 205, light sources 220, 230 and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280 having lenses 286 and 288, and the coaxial light source 230. Alternatively to the turret lens assembly, a fixed or manually interchangeable magnification-altering lens, or a zoom lens configuration, or the like, may be included. The optical assembly portion 205 is controllably movable along a Z-axis that is generally orthogonal to the X and Y axes, by using a controllable motor 294, as described further below.

A workpiece 20 that is to be imaged using the machine vision inspection system 100 is placed on the workpiece stage 210. One or more of a stage light 220, a coaxial light 230, and a surface light 240 may emit source light 222, 232, or 242, respectively, to illuminate the workpiece 20. The source light is reflected or transmitted as workpiece light 255, which passes through the interchangeable objective lens 250 and the turret lens assembly 280 and is gathered by the camera system 260. The image of the workpiece 20, captured by the camera system 260, is output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284, to select a turret lens, through a signal line or bus 281.

In various exemplary embodiments, the optical assembly portion 205 is movable in the vertical Z-axis direction relative to the workpiece stage 210 using a controllable motor 294 that drives an actuator, a connecting cable, or the like, to move the optical assembly portion 205 along the Z-axis to change the focus of the image of the workpiece 20 captured by the camera system 260. The term Z-axis, as used herein, refers to the axis that is intended to be used for focusing the image obtained by the optical assembly portion 205. The controllable motor 294, when used, is connected to the input/output interface 130 via a signal line 296.

As shown in FIG. 2, in various exemplary embodiments, the control system portion 120 includes a controller 125, an input/output interface 130, a memory 140, a workpiece program generator and executor 170, and a power supply portion 190. Each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 may include a position control element 132a, and a speed/acceleration control element 132b. However, it should be appreciated that in various exemplary embodiments, such elements may be merged and/or indistinguishable. The lighting control interface 133 includes lighting control elements 133a-133n, which control, for example, the selection, power, on/off switch, and strobe pulse timing if applicable, for the various corresponding light sources of the machine vision inspection system 100.

The memory 140 includes an image file memory portion 141, a workpiece program memory portion 142 that may include one or more part programs, or the like, and a video tool portion 143. The video tool portion 143 includes tool portion 143a, and other similar tool portions (not shown), which determine the GUI, image processing operation, etc., for each of the corresponding tools. The video tool portion 143 also includes a region of interest generator 143x that supports automatic, semi-automatic and/or manual operations that define various ROIs that are operable in various video tools included in the video tool portion 143.

In particular, in various embodiments according to this invention, the video tool portion 143 includes the autofocus tools portion 143f, which provides various operations and features related to autofocus operations, as described in greater detail below. In one embodiment, the autofocus tools portion 143f may include an autofocus mode control 143fa, high accuracy autofocus tools 143fb, and a fast approximate autofocus tool 143fc. Briefly, the high accuracy autofocus tools 143fb may operate similarly to known autofocus tools, for example, performing operations in learn mode and run mode such as acquiring a current image stack at various Z heights, generating all or part of a focus curve, and finding its peak as a best focus position that is always "customized" to the current workpiece feature and operating conditions. The fast approximate autofocus tool 143fc operates based on the fast approximate focus methods of the present invention. In contrast to the "high accuracy" autofocus tools 143fb, the fast approximate autofocus tool 143fc determines a representative focus curve for a particular feature in learn mode, and refers that same focus curve data when inspecting a similar particular feature during run mode, to avoid the time consuming process of acquiring and analyzing a new image stack in run mode. The autofocus mode control 143fa may perform operations, as disclosed herein, to configure the autofocus tools (that is the high accuracy autofocus tools 143fb or the fast approximate autofocus tool 143fc) or tool modes, depending on which tool or mode is activated.

The descriptor "high accuracy" of the autofocus tools 143fb is not intended to be limiting, it is simply chosen in contrast to the lower focus accuracy of the fast approximate autofocus tool 143fc, intended to accept somewhat degraded image focus, in exchange for higher throughput. The high accuracy autofocus tools 143fb generally provide the best focus position, which indicate the corresponding surface Z height rather accurately. In contrast, the fast approximate autofocus tool 143fc utilizes the methods of the present invention to quickly provide an approximately focused image, which may reliably support sufficiently accurate X-Y edge measurements, but is most often not suitable for determining an accurate Z height measurement.

Alternative configurations are possible for the autofocus tools portion 143f. For example, the high accuracy autofocus tool 143fb and the fast approximate autofocus tool 143fc may include partitioned mode control functions such that a separate mode control portion 143fa may be omitted. Alternatively, the autofocus tools portion 143f may provide one or more generic autofocus tool elements, and the mode control portion 143fa may provide operations that govern the user interface and interrelationships of the generic autofocus tool elements in a manner that depends on whether high accuracy autofocus tool behavior, or fast approximate autofocus tool behavior, is desired. In such a case, the circuits, routines, or applications that provide the operations of the high accuracy autofocus tools 143fb, and/or the fast approximate autofocus tool 143fc, may be merged and/or indistinguishable. In certain implementations, the autofocus mode control 143fa may be utilized to implement a fast approximate autofocus mode (as opposed to a separate tool). More generally, this invention may be implemented in any now known or later-developed form that is operable in conjunction with the machine vision inspection system 100 to provide the features disclosed herein in relation to the fast approximate autofocus operations.

In general, the memory portion 140 stores data usable to operate the vision system components portion 200 to capture or acquire an image of the workpiece 20 such that the acquired image of the workpiece 20 has desired image characteristics. The memory portion 140 may also store inspection result data, further may store data usable to operate the machine vision inspection system 100 to perform various inspection and measurement operations on the acquired images (e.g., implemented, in part, as video tools), either manually or automatically, and to output the results through the input/output interface 130. The memory portion 140 may also contain data defining a graphical user interface operable through the input/output interface 130.

The signal lines or busses 221, 231 and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 and one or more input devices 138 can also be connected to the input/output interface 130. The display devices 136 and input devices 138 can be used to display a user interface, which may include various graphical user interface (GUI) features that are usable to perform inspection operations, and/or to create and/or modify part programs, to view the images captured by the camera system 260, and/or to directly control the vision system components portion 200. In a fully automated system having a predefined part program (or workpiece program), the display devices 136 and/or the input devices 138 may be omitted.

In various exemplary embodiments, when a user utilizes the machine vision inspection system 100 to create a part program for the workpiece 20, the user generates part program instructions either by explicitly coding the instructions automatically, semi-automatically, or manually, using a workpiece programming language, or by generating the instructions by operating the machine vision inspection system 100 in learn mode to provide a desired image acquisition training sequence. For example a training sequence may comprise positioning a workpiece feature in the field of view (FOV), setting light levels, focusing or autofocusing, acquiring an image, and providing an inspection training sequence applied to the image (e.g., using video tools). Learn mode operates such that the sequence(s) are the captured and converted to corresponding part program instructions. These instructions, when the part program is executed, will cause the machine vision inspection system to reproduce the trained image acquisition and inspection operation to automatically inspect a workpiece or workpieces matching the workpiece used when creating the part program.

These analysis and inspection methods that are used to inspected features in a workpiece image are typically embodied in various video tools included in the video tool portion 143 of the memory 140, including the autofocus tools 143fb and 143fc. Many known video tools, or "tools" for short, are included in commercially available machine vision inspection systems, such as the QUICK VISION® series of vision systems and the associated QVPAK® software, discussed above.

Figure 3:
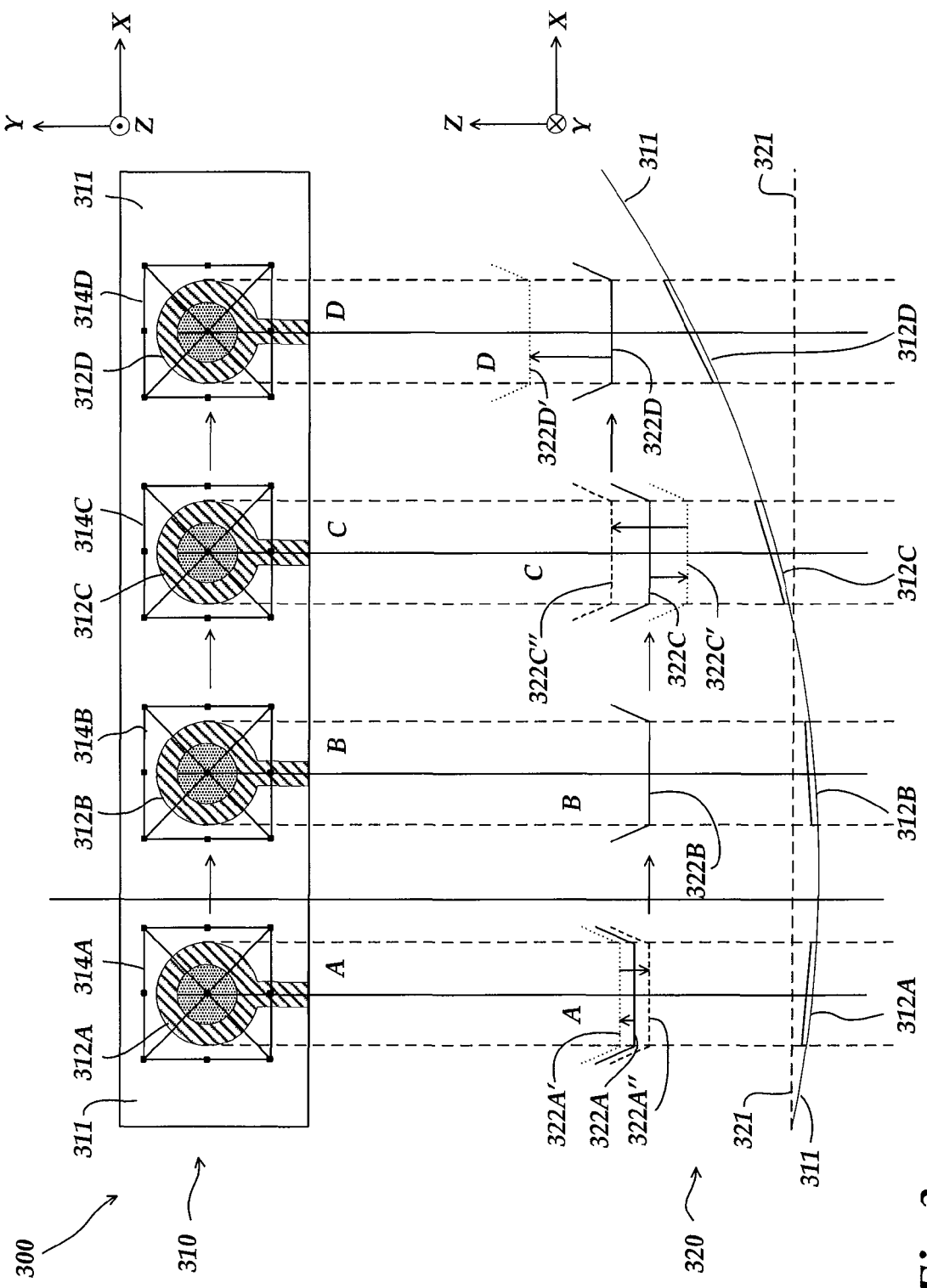
FIG. 3 is a diagram showing top and side views of a workpiece and a series of features to be inspected, along with a sequence of focus positions of a camera according to one embodiment of fast approximate autofocus operations during a sequence of feature inspections.

FIG. 3 is a diagram 300 showing a top view 310 and a side view 320 of a series of workpiece features to be inspected in run mode, along with a sequence of camera focus positions during a sequence of feature inspections, according to one embodiment of fast approximate autofocus operations. As shown in the top view 310, the workpiece 311 includes workpiece features 312A-312D. For purposes of explanation, each of the workpiece features 312A-312D are shown encompassed in a region of interest (ROI) defined by the outer boundaries of its corresponding fast autofocus video tool, such as might be selected, observed, and manipulated in learn mode to create a part program, as described in more detail below with respect to FIG. 10. However, it will be understood that the various features and their corresponding video tools are typically positioned in the field of view of the camera one at a time, as implied in the description below. Each separate instance of a fast autofocus video tool GUI widget is part of corresponding instance of the fast autofocus video tool. Because of this one-to-one correspondence, it is often convenient to refer to the graphical widget and the tool interchangeably, and the meaning will be clear based on context. Nevertheless, it will be understood that the two terms are not actually identical, and the tool encompasses underlying operations and other features, in addition to the widget.

In FIG. 3, the part program inspection sequence flows from left to right, as indicated by the arrows, starting with the inspection of the workpiece feature 312A and proceeding subsequently to each of the workpiece features 312B, 312C and 312D. For purposes of explanation, one may think of a camera moving from left to right across the workpiece 311 and successively acquiring images of the regions of interest of each of the video tools 314A-314D, as outlined below. The fast autofocus video tools 314A-314D govern the focusing operations that are performed in order to acquire acceptable inspection images of the corresponding regions of interest.

As shown in the side view 320, in this example the workpiece 311 is warped relative to a horizontal dashed line 321 that represents a flat and level surface plane of a workpiece that was utilized for creating the part program during learn mode, as will be described in more detail below. In general, it will be appreciated that certain nominally flat and thin workpiece parts may be relatively easy to deform and/or inadvertently tilt on the stage (e.g., printed circuit boards, large flat panel displays, etc). Thus, the run mode workpieces may not conform to the shape of the representative workpieces used for training in learn mode. The deformation of the workpiece 311 in FIG. 3 is exaggerated in the Z direction for purposes of illustration. In addition, a purely schematic representation of the camera has been utilized to emphasize the focusing movements that are described in more detail below.

As shown in the side view 320 for the workpiece feature 312A, the camera is initially set at a nominal Z height 322A that corresponds to a learned initial focusing position (a Z position) relative to the flat plane 321 as established during learn mode. It will be appreciated that because the workpiece feature 312A on the warped surface of the workpiece 311 falls significantly below the flat plane 321, that the nominal Z height 322A of the camera does not result in an acceptable focus metric value (also referred to as a focus value) in the ROI, as will be described in more detail below. A default primary adjustment direction was initially programmed or established, which in this case causes the camera to move upwards by an initial adjustment distance, from the Z height 322A to a Z height 322A'. The initial adjustment distance is an estimated distance from Z height 322A to a best focus position, based on focus curve data determined during learn mode and the current focus value, as will be described in more detail below. At the Z height 322A', a new image is acquired and the focus value is again evaluated, and is again determined to be not acceptable and further determined to be worse than the first focus value. As a result of this outcome, the routine then moves the camera in the opposite direction by an adjustment distance that, as before, is estimated as the distance to a best focus position (e.g., by 2× the distance moved in the initial adjustment direction), and a new image is acquired. This adjustment results in the camera being at the Z height 322A". At the Z height 322A", the camera is below the initially learned and programmed position 322A, just as the workpiece feature 312A is below the position of its corresponding feature during learn mode. As a result, a focus value determined for the ROI in the new/current image is determined to be at an acceptable level (e.g., as outlined below with reference to FIG. 4), and inspection operations (e.g., X-Y edge location measurement operations) are performed in the current image. The part program then moves the camera to the programmed X-Y location of the next workpiece feature 312B. In the fast approximate focus video tool operations embodiment shown in FIG. 3, the camera is moved and positioned at the last successful camera Z height that produced an acceptable inspection image (i.e., at Z height 322A"), "overruling" any Z-height of the feature 312B that may have been observed or recorded in learn mode. It is advantageous to include this feature in various embodiments of the fast approximate focus video tool operations, however, it is not strictly required. An image is acquired at the initial Z height 322B (which equals 322A"), and the focus value determined in the ROI happens to be acceptable due to the warp of the workpiece 311, which positions the workpiece feature 312B at approximately at the same height as the workpiece feature 312A. Inspection operations are performed in the image.

The part program then moves the camera to the programmed X-Y location of the next workpiece feature 312C. As before, the camera is moved and positioned at the last successful camera Z height that produced an acceptable inspection image (i.e., at Z height 322B). An image is acquired at the initial Z height 322C (which equals 322B). Because the workpiece feature 312C is at a significantly different height than the workpiece feature 312B, and the camera is initially at the same Z height, the acquired image is significantly out of focus and does not provide an acceptable focus value in the ROI. In the fast approximate focus video tool operations embodiment shown in FIG. 3, if a previous fast approximate focus tool moved to a successful image height, the direction of that move is stored and used as the primary adjustment direction for a subsequent instance of fast approximate focus tool. In this example, this causes the camera to move downwards by an initial adjustment distance, from the Z height 322C to a Z height 322C'. As with all adjustment distances, the initial adjustment distance is an estimated distance from the current Z height 322A to a best focus position, based on focus curve data determined during learn mode and the current focus value, as will be described in more detail below. At the Z height 322C', a new image is acquired and the focus value is again evaluated, and is again determined to be not acceptable and further determined to be worse than the first focus value. As a result of this outcome, the routine then moves the camera in the opposite direction by an adjustment distance that, as before, is estimated as the distance to a best focus position (e.g., by 2× the distance moved in the initial adjustment direction), and a new image is acquired. The adjustment results in the camera being positioned at the Z height 322C". At the Z height 322C", the camera is above the last successful Z height 332B, just as the workpiece feature 312C is above the position of the previous workpiece feature 312B. The camera has now followed the local deformation or tilt of the part. As a result, a focus value determined for the ROI in the new/current image is determined to be at an acceptable level, and inspection operations are performed in the current image.

The part program then moves the camera to the programmed X-Y location of the next workpiece feature 312D, and at the last successful camera Z height that produced an acceptable inspection image (i.e., at Z height 322C"). An image is acquired at the initial Z height 322D (which equals 322C"). Because the workpiece feature 312D is at a significantly different height than the workpiece feature 312C, the acquired image is significantly out of focus and does not provide an acceptable focus value in the ROI. As previously noted, in the fast approximate focus video tool operations embodiment shown in FIG. 3, if a previous fast approximate focus tool moved to a successful image height, the direction of that move is stored and used as the initial search direction for a subsequent fast approximate focus tool. This is a good strategy for gently warped or tilted surfaces, which will generally maintain a consistent slope direction for large portions of the surface (which is the case for the current feature). Thus, in this example, the camera then moves upwards by an initial adjustment distance, from the Z height 322D to a Z height 322D'. The initial adjustment distance is estimated as outlined above. At the Z height 322D', a new image is acquired and the focus value is again evaluated, and is determined to be acceptable. At the Z height 322D', the camera is above the last successful Z height 322C", just as the workpiece feature 312D is above the position of the previous workpiece feature 312C. The camera has continued to follow the local deformation or tilt of the part. As a result, a focus value determined for the ROI in the new/current image is determined to be at an acceptable level, and inspection operations are performed in the current image.

Figure 4:
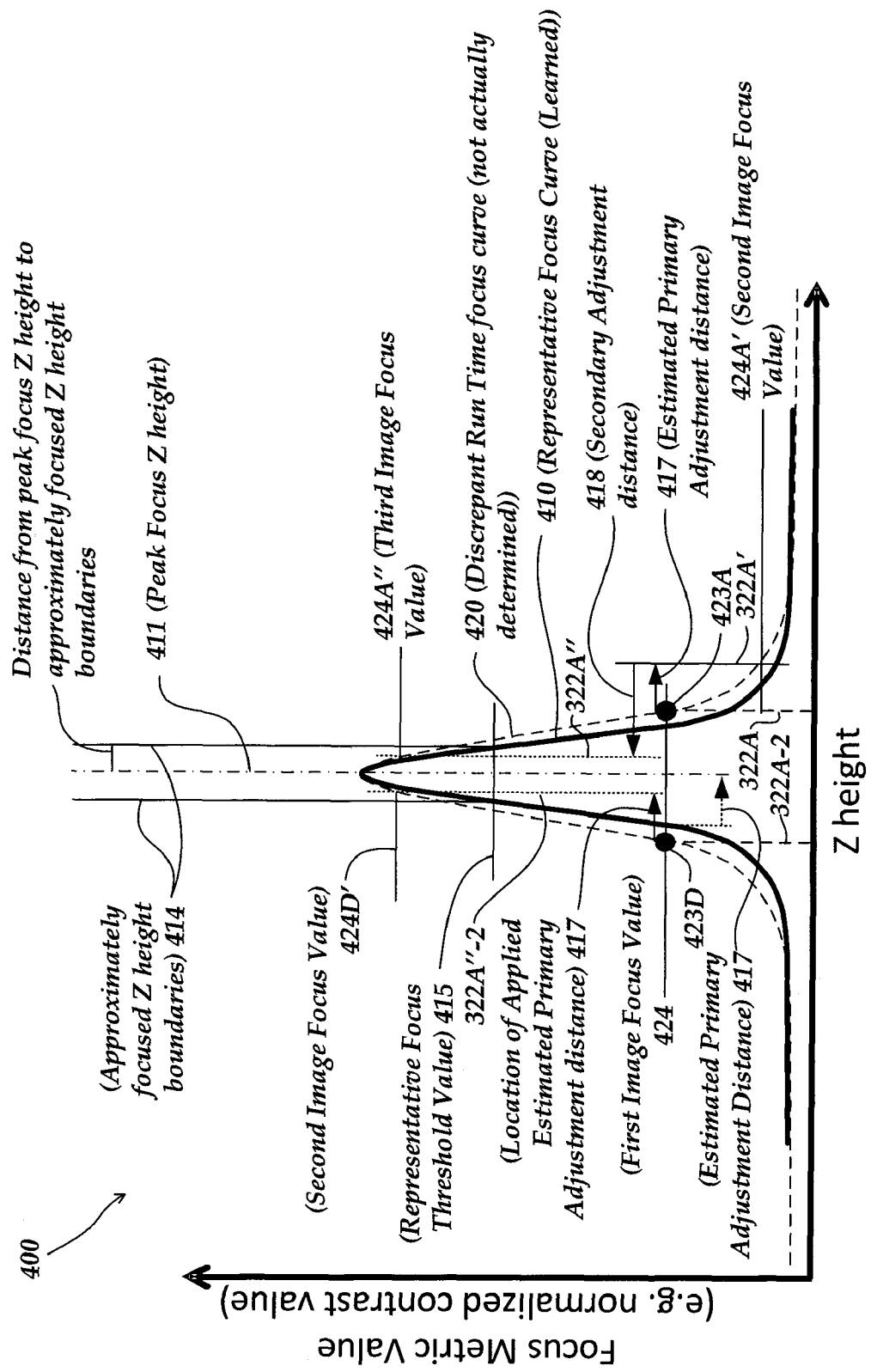
FIG. 4 is a representative graph illustrating a learned representative focus curve and a discrepant run time focus curve.

FIG. 4 is a diagram of a graph 400 illustrating a learned representative focus curve 410, which is determined and/or recorded in the part program during learn mode operations, and a discrepant run mode focus curve 420. Each focus curve corresponds to the ROI defined in one instance of a fast approximate focus tool. In particular, the ROI corresponds to the same feature during learn mode and run mode operations. In this context "the same feature" means a feature that is similar and congruent on two different workpieces. It should be appreciated that the discrepant run mode focus curve 420 is not actually determined, but it underlies or reflects run mode focus behavior and is illustrated here for the purpose of explanation. In general, to produce the learned representative focus curve 410 during learn mode, the camera of the machine vision system is moved through a range of positions along the Z-axis to capture an image at each position. Exemplary techniques for the determination and analysis of focus curves are taught in U.S. Pat. No. 6,542,180, which is hereby incorporated herein by reference in its entirety. For each captured image, a focus metric value is calculated for the ROI and paired with the corresponding Z position of the camera at the time that image was captured, to provide data points (coordinates) that define the focus curve. In one embodiment, the focus metric may involve a calculation of the contrast or sharpness of the region of interest in an image. In various embodiments the focus values or curve may be normalized (e.g., as implied by FIG. 4). In one embodiment, the focus values or curve may be normalized by the average grayscale value or average of squared grayscale values of the image pixels in the ROI. Various focus metrics are described in detail in the incorporated references, and various suitable focus value functions will also be known to one of ordinary skill in the art. Thus, such functions will not be further described.

As is generally known, the shape of a focus curve depends on a number of factors, such as the type of surface (e.g., shape, texture, etc.), the depth of field, the size of the region of interest (e.g., a larger region of interest may correspond to less noise), lighting conditions, etc. The focus metric values (e.g., normalized contrast values) on the Y-axis of FIG. 4 generally correspond to the quality of the focus of a feature included in the region of interest of a corresponding image. A focus value higher on the Y-axis corresponds to better focus. Thus, a best focus position corresponds to the peak of the focus curve (e.g., the peak focus Z height 411), as will be described in more detail below. A focus curve is often approximately symmetric and resembles a bell curve. In the embodiment reflected in FIG. 4, the focus values for the curves 410 and 420 have been "ideally" normalized (i.e., their maxima have been made equal, although in practice they would normally differ slightly, even after normalization) such that they may be compared properly. It will be appreciated that normalization of the full focus curve 420 would not be performed in an actual embodiment, because the data of focus curve 420 is not actually acquired in practice (it is shown only for purposes of explanation in FIG. 4). However, normalizing the first image focus value 424, and other solitary image focus values determined during run mode (e.g., by the average grayscale value or average squared grayscale value of the region of interest) may generally be done in various embodiments, in order to compensate for the effects of factors such as variable lighting conditions, surface finish, and the like.

As outlined above, the learned representative focus curve 410 may be a curve fit to a set of focus value data points determined when training an instance of a fast approximate focus tool during learn mode. In contrast, the run mode focus curve 420 is not determined by fast approximate focus operations. However, if high accuracy autofocus operations are performed during the run mode, the focus curve 420 would result. As will be described in more detail below, one important advantage of the fast approximate focus operations of the present invention is that the focus curve 420 is generally not determined, which eliminates the time-consuming image acquisition operations associated with generating a focus curve. Rather, the learned representative focus curve 410 represents or substitutes for the underlying run mode focus curve 420, for the purposes of determining an acceptable approximate focus position.

For purposes of explanation, we may consider FIG. 4 to depict the basis for certain operations previously described with respect to FIG. 3. For example, the learned representative focus curve 410 may correspond to a feature on the flat plane 321 of FIG. 3 during learn mode operations. The discrepant (e.g., wider) run mode focus curve 420 may correspond to the same feature on the warped workpiece 311 during run mode operations (feature 312A in this explanation). Both curves are normalized as previously outlined. The run mode focus curve 420 may be discrepant relative to the learned representative focus curve 410 because the warped workpiece 311 has a slightly different configuration than the flat plane 321 of the learn mode workpiece. Due to such discrepancies, the estimated adjustment distances previously described with respect to FIG. 3, which are based on the learned representative focus curve 410, will be somewhat incorrect. The estimated adjustment distances will therefore not position the camera precisely at the peak focus Z height 411. However, in embodiments reflected in FIG. 4, if the estimated adjustment distance provides an approximately focused Z height that falls between the Z height boundaries 414, the fast approximate focus operations accept this as a sufficient focus level to support the subsequent inspection operations which are to be performed in the corresponding image. Applying the fast approximate focus operations may be particularly advantageous when the subsequent inspection operations are X-Y edge detection, and related X-Y measurement operations. This is because such X-Y measurement operations are relatively insensitive to a reasonable amount of image blurring, which tends to broaden an edge profile without significantly displacing a central location (e.g., a maximum gradient point) of the edge profile. Therefore, in such cases a fast approximate focus tool or mode may be used to increase inspection throughput, without significantly affecting inspection accuracy.

The approximately focused Z height boundaries 414 may be established according to a predetermined value or algorithm included in a fast approximate focus tool or mode, and subsequently applied in the part program. In this regard, when the approximately focused Z height boundaries 414 are applied to the representative focus curve 410, they can be seen to define a representative focus threshold value 415 at their intersection. As will be described in more detail below, the focus threshold value 415 may be utilized to help quickly achieve an acceptable approximate focus, while avoiding the time consuming task of determining a run mode focus curve 420. In various embodiments, the Z height boundaries 414 are advantageously set away from the peak focus Z height between 1 and 7 times the known depth of field (DOF) of the current optical system, and more advantageously between 2-7 times the DOF. Z height boundaries set in this way typically define a low enough threshold for the fast approximate focus operations outlined above to identify sufficiently focused images, despite the discrepancies between the learn mode and run mode focus curves. At the same time, such settings have been shown to define a normalized focus threshold value (on a learn mode focus curve) that provides a desirable level of X-Y measurement accuracy and repeatability for a wide variety of workpieces. However, more generally, the Z height boundaries 414 may be set at any number of DOFs that reliably provides sufficiently focused images, yet allows enough image defocus such that the fast approximate focus operations typically are able to provide an acceptable image that has a focus value above the focus threshold value 415 that corresponds to the Z height boundaries 414.

The foregoing embodiments are not limiting. For example, in some embodiments the corresponding focus threshold value 415 is applied in the part program, rather than explicitly using the approximately focused Z height boundaries 414. In other embodiments, other threshold determining methods and/or values may be utilized, and in certain implementations the focus threshold value 415 may be variable. In certain implementations, the focus threshold value 415 may be adjusted slightly based on information gained at run mode.

The following description essentially repeats the previous description of the operations surrounding the feature 312A of FIG. 3, while adding additional explanation in terms of FIG. 4. As shown in FIG. 3, in the side view 320 for the workpiece feature 312A, the camera is initially set at a nominal Z height 322A that corresponds to a learned initial focusing position (a Z position) relative to the flat plane 321 as established during learn mode. A first image is acquired, and a first image focus value is determined for the ROI in that image, as represented by the line 424 in FIG. 4. As shown in FIG. 4, it will be appreciated that because the configuration of the run mode workpiece is not known, the location of the best focus Z height is generally not known, and the first image focus value 424 might correspond to either of two candidate Z heights, represented by the points 423A and 423D. The fast approximate focus methods of the present invention are designed to automatically address both of these cases, with very few motions. The description of focus operations in FIG. 3, corresponds to the case where the Z height 322A actually corresponds to the candidate point 423A. In that case, because the workpiece feature 312A on the warped surface of the workpiece 311 falls significantly below its presumed Z height (the height of the flat plane 321 during learn mode) as shown in FIG. 3, the image at the first Z height 322A results in the relatively low focus value 424, shown in FIG. 4. Since the focus value 424 is below the representative focus threshold value 415, the focus value 424 is unacceptable and the first image is determined to be an unacceptable inspection image. Therefore, the fast approximate focus operations adjust the Z height by moving along an initial or primary adjustment direction that was initially programmed or established, for an estimated primary adjustment distance, which in this case causes the camera to move upwards by an initial adjustment distance 417 shown in FIG. 4, from the Z height 322A to a Z height 322A'. The estimated primary adjustment distance is an estimated distance from the Z height 322A to a peak focus Z height 411, based on the representative focus curve 410 (determined during learn mode) and the current focus value 424. At the Z height 322A', a second image is acquired and a second focus value 424A' is determined for the ROI.

In this case, because the primary adjustment direction was the wrong direction, the second focus value 424A' is below the representative focus threshold value 415, and is even worse than the first focus value 424, and the second image is determined to be an unacceptable inspection image. As a result, the fast approximate focus operations adjust the Z height by moving from the Z height 322A' along the direction that is opposite to the primary adjustment direction, by a secondary adjustment distance 418, to arrive at the Z height 322A". As before, the secondary adjustment distance 418 is an estimated distance to the peak focus Z height 411 from the current Z height. In one embodiment, the secondary adjustment distance is estimated simply as two times the distance moved in the primary adjustment direction, which should arrive at the peak focus Z height if the focus curve 420 is not discrepant relative to the focus curve 410, and the focus curve 410 is approximately symmetrical. In another embodiment, the secondary adjustment distance is based on the representative focus curve 410 (as determined during learn mode) and the current focus value 424A', which may be advantageous if the focus curve 410 is asymmetrical. In any case, at the Z height 322A" a third image is acquired and a third image focus value 424A" is determined for the ROI. In this case, because the secondary adjustment direction was the correct direction, despite the effects of the discrepant focus curve 420, the third image focus value 424A" is above the representative focus threshold value 415, and the third image is determined to be approximately focused such that it is an acceptable inspection image. It will be appreciated that following the first image acquisition at the current feature to be inspected, the fast approximate autofocus operations outlined above require at most two moves along the Z direction in order to provide an acceptable approximately focused inspection image. In comparison to conventional autofocus methods and tools (e.g., based on actually determining the run mode focus curve and it peak focus Z height), this allows the fast approximate focus operations outlined to increase the inspection throughput significantly (e.g., doubling the throughput) when repetitively performing compatible inspection operations for a series of features (e.g., when measuring the X-Y dimensions and locations of printed circuit board or IC elements such as holes, feedthroughs, connection traces, or the like).

The following description may generally be understood to follow the initial sequence of operations outlined above. However, the following description corresponds to a hypothetical case where the run mode workpiece does not have the configuration shown in FIG. 3. Rather it has a configuration such that current workpiece feature is positioned significantly above its presumed Z height (e.g., due to a warping that is the mirror image of that shown in FIG. 3). As shown in FIG. 4, the presumed Z height 322A-2 is used for the first image acquisition (that is, the representative feature height during learn mode). This corresponds to the case where the initial Z height 322A-2 actually corresponds to the candidate point 423D. As shown in FIG. 4, the image at the first Z height 322A-2 results in the relatively low focus value 424. Since the focus value 424 is below the representative focus threshold value 415, the focus value 424 is unacceptable and the first image is determined to be an unacceptable inspection image. Therefore, the fast approximate focus operations adjust the Z height by moving along the initial or primary adjustment direction that was initially programmed or established, for an estimated primary adjustment distance, which in this case again causes the camera to move upwards by an initial adjustment distance 417 shown in FIG. 4, from the Z height 322A-2 to a Z height 322A"-2. The estimated primary adjustment distance is again an estimated distance from the Z height 322A-2 to the peak focus Z height 411, based on the representative focus curve 410 (determined during learn mode) and the current focus value 424. At the Z height 322A"-2, a second image is acquired and a second image focus value 424D' is determined for the ROI. In this case, because the primary adjustment direction was the correct direction, despite the effects of the discrepant focus curve 420, the second image focus value 424D' is above the representative focus threshold value 415, and the second image is determined to be approximately focused such that it is an acceptable inspection image.

Figure 5:
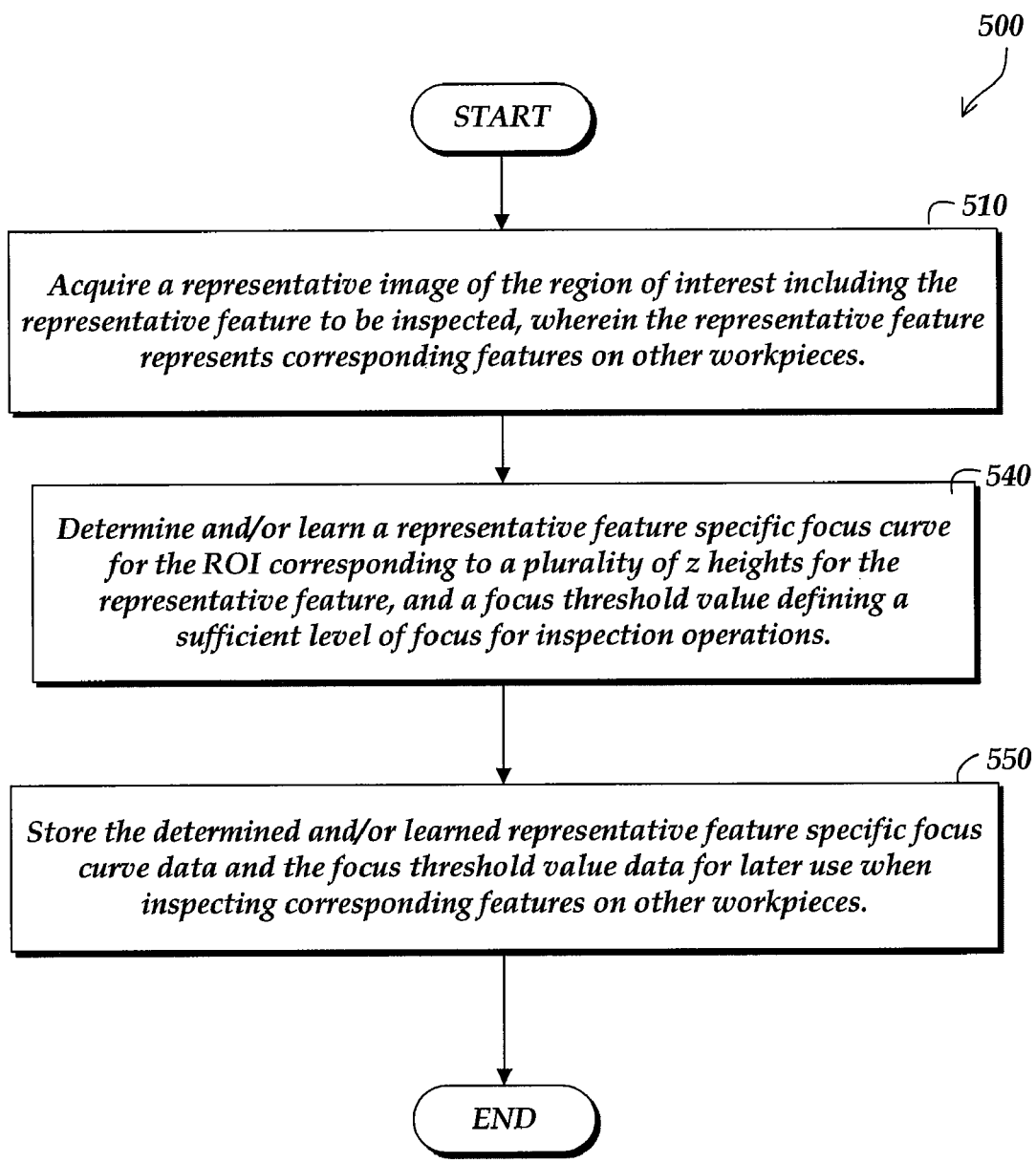
FIG. 5 is a flow diagram illustrating an exemplary general routine for a fast approximate focus operations during learn mode.

FIG. 5 is a flow diagram illustrating an exemplary general routine 500 for implementing fast approximate focus operations during learn mode. In general, FIG. 5 describes a set of operations for determining a representative focus curve and focus threshold value, given an image of a representative region of interest (ROI) including a representative feature to be inspected. As shown in FIG. 5, at a block 510 a representative image is acquired of the region of interest including the representative feature to be inspected, wherein the representative feature represents corresponding features on other workpieces (e.g., one of the features 312A-312D of FIG. 3). At a block 540, a representative feature-specific focus curve (e.g., see curve 410 of FIG. 4) for the region of interest (ROI) is determined and/or learned. The representative feature-specific focus curve corresponds to a plurality of images at respective Z height steps between the camera and the representative feature. A focus threshold value (e.g., see threshold value 415 of FIG. 4) defining a sufficient level of focus for inspection operations, is also determined and/or learned. It will be appreciated that when an image provides a focus value that is above the focus threshold value, it may be considered sufficiently "in-focus" for purposes of the inspection operations that are to be performed, even though the level of focus may not be the best focus, but only an approximate focus.

At a block 550, the determined and/or learned representative feature-specific focus curve data and the focus threshold value data are stored for later use when inspecting corresponding features on other workpieces. In one embodiment, the "curve data" may correspond to a conventional form of a focus curve, and the "value data" may correspond to a standard threshold value, as will be described in more detail below. In other embodiments the curve data may correspond to other types of data, such as a dense focus curve "focus value-to-Z" lookup table, coefficients that customize a nominal analytical curve shape, a pruned lookup table, etc. Similarly, in other embodiments the focus threshold value data may correspond to other types of data, such as "depth of field (DOF) units" that are used cooperatively with the curve data to compute a numerical focus value at run mode, a numerical value computed and stored at learn time, a multiplication factor (e.g., a fraction) for the focus curve peak height, etc.

Figure 6:
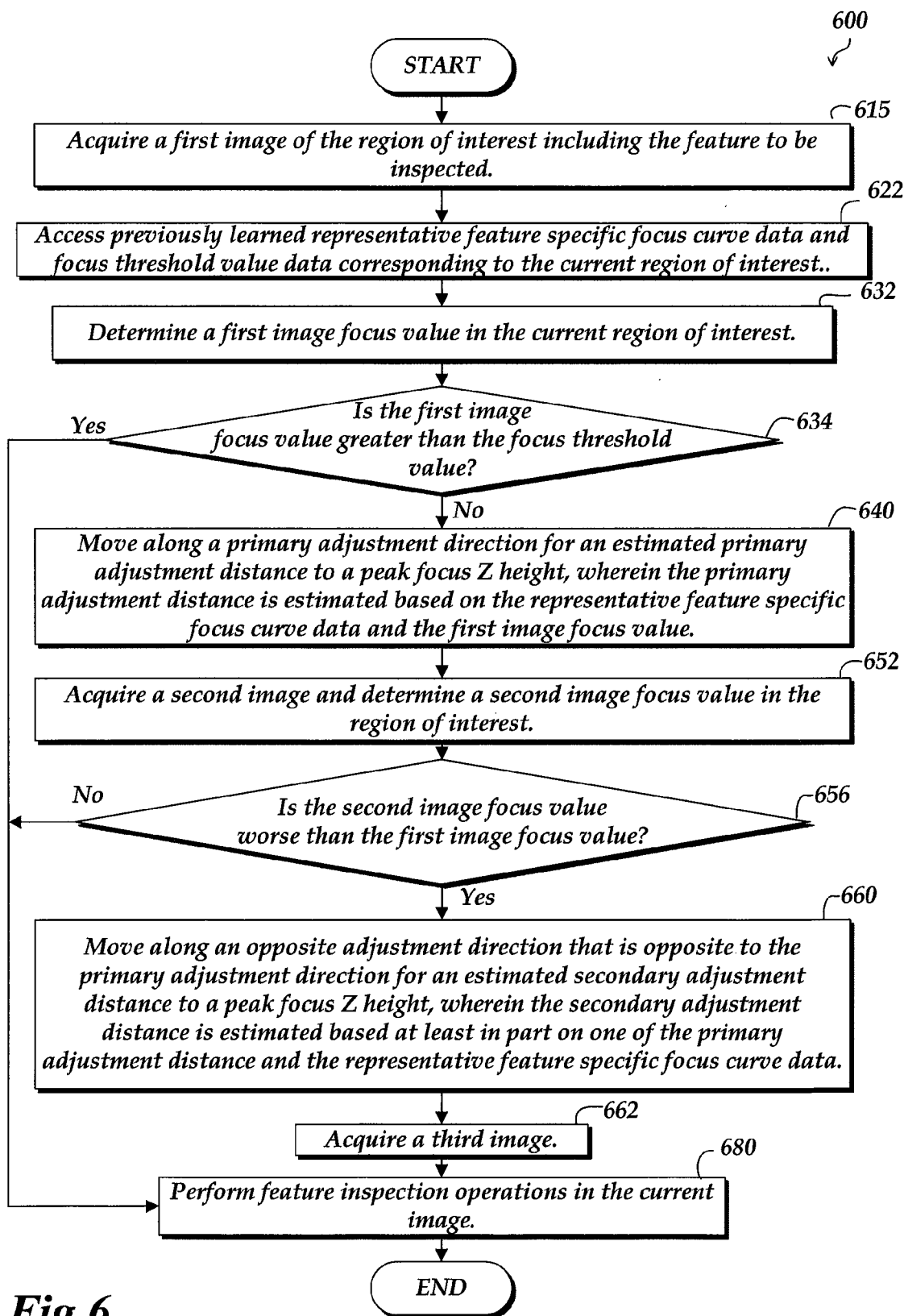
FIG. 6 is a flow diagram illustrative of an exemplary general routine for fast approximate focus operations during run mode.

FIG. 6 is a flow diagram illustrative of an exemplary general routine 600 for an embodiment of fast approximate focus operations during run mode. In general, FIG. 6 describes a set of operations according to the present invention for employing a set of representative focus curve data and focus threshold value data to provide a fast approximate focus for an image to be used for inspecting a workpiece feature. In general, the representative focus curve data and focus threshold value data will have been previously established for a corresponding feature in a corresponding workpiece (e.g., in a learn mode). Such use of fast approximate focus operations provides an acceptable level of accuracy in many applications where the inspection is primarily based on X-Y measurements, which in various applications may remain reliable even when they are determined from an inspection image which includes some amount of image blur (e.g., an image that may be considered only approximately in focus.)

As shown in FIG. 6, at a block 615 a first image is acquired of the region of interest, including the feature to be inspected. At a block 622, previously learned representative feature-specific focus curve data and focus threshold value data corresponding to the current region of interest are accessed. At a block 632, a first image focus value in the current region of interest is determined. At a decision block 634, a determination is made as to whether the first image focus value is greater than the focus threshold value. If the first image focus value is not greater than the focus threshold value, then the routine continues to a block 640, as will be described in more detail below. If at decision block 634 it is determined that the first image focus value is greater than the focus threshold value, then the routine continues to a block 680, where feature inspection operations are performed in the current image.

At the block 640, a movement is made in a primary adjustment direction for an estimated primary adjustment distance to a peak focus Z height, wherein the primary adjustment distance is estimated based on the representative feature-specific focus curve data and the first image focus value. At a block 652, a second image is acquired and a second image focus value is determined in the region of interest. At a decision block 656, a determination is made as to whether the second image focus value is worse than the first image focus value. If the second image focus value is worse than the first image focus value, then the routine continues to a block 660, as will be described in more detail below. If at decision block 656 it is determined that the second image focus value is not worse than the first image focus value, then the routine continues to the block 680, where feature inspection operations are performed in the current image. As will be described in more detail below with respect to FIGS. 8A and 8B, in other embodiments a fast approximate focus run mode routine may additionally verify that the second image focus value is greater than the focus threshold value before performing the feature inspections in the current image. In other words, the routine 600 may be advantageous in a desirable case wherein well controlled workpieces provide a run mode focus curves that are predictably similar to the learned representative focus curve (e.g., see examples of FIG. 4) such that if a focus value improvement is recognized at decision block 656, since the estimated primary adjustment distance was based on the learned representative focus curve, which is assumed to be similar to the run mode focus curve, it is further assumed that the resulting Z height is near enough to the peak of the focus curve to be above the focus threshold value.

At the block 660, since the second image focus value was previously determined to be worse than the first image focus value, a movement is made in a direction that is opposite to the initial or primary adjustment direction for an estimated secondary adjustment distance to a peak focus Z height, wherein the secondary adjustment distance is estimated based on at least one of the primary adjustment distance and the representative feature-specific focus curve data in combination with the second image focus value. In one embodiment, the estimated secondary adjustment distance may be approximately two times the primary adjustment distance, although in the opposite direction. At a block 662, a third image is acquired. At the block 680, feature inspection operations are performed in the current image. As will be described in more detail below with respect to FIGS. 8A and 8B, in other embodiments a fast approximate focus run mode routine may additionally verify that the third image focus value is greater than the focus threshold value before performing the feature inspection operations in the third image.

Figure 7:
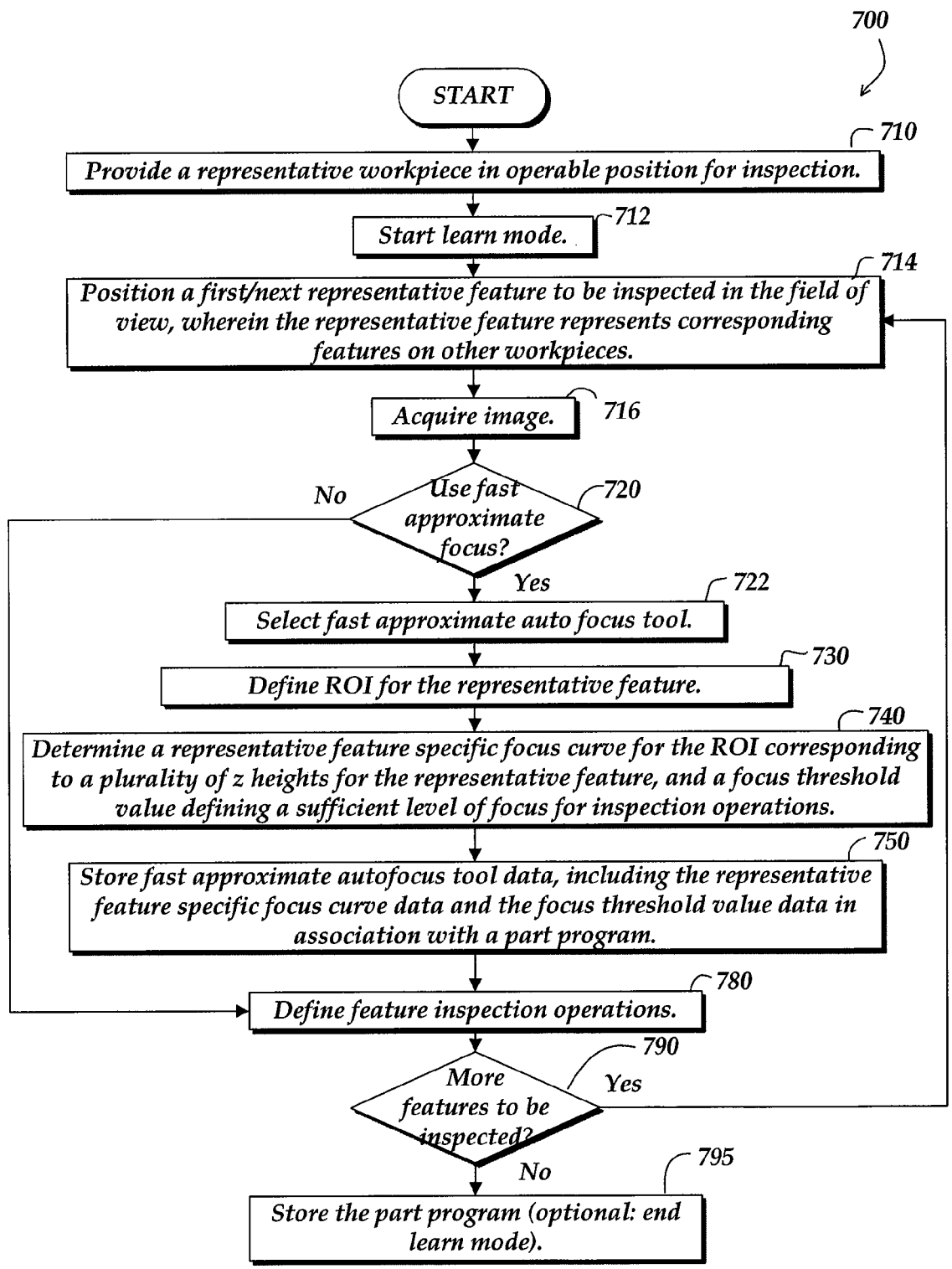
FIG. 7 is a flow diagram illustrative of a routine for an augmented implementation of fast approximate focus operations during learn mode.

FIG. 7 is a flow diagram illustrative of a routine 700 for an augmented implementation of fast approximate focus operations during learn mode. It will be appreciated that the fast approximate focus learn mode routine 700 may in certain embodiments be considered to be an augmented implementation falling within, or overlapping with, the scope of various embodiments of the general fast approximate focus learn mode routine 500 of FIG. 5. As shown in FIG. 7, at a block 710 a representative workpiece is provided in an operable position for inspection. At a block 712, a learn mode is started. At a block 714, a first/next representative feature to be inspected is positioned in the field of view, wherein the representative feature represents corresponding features on other workpieces. At a block 716, an image is acquired. At a decision block 720, a determination is made as to whether fast approximate focus operations will be used. If fast approximate focus operations will be used, then the routine continues to a block 722, as will be described in more detail below. If at decision block 720 it is determined that fast approximate focus operations will not be used, then the routine continues to a block 780, where other feature inspection operations are defined. It will be appreciated that when the routine continues from the decision block 720 to the block 780, that in certain implementations this indicates that for the inspection operations to be performed on the current feature, the fast approximate focus is not appropriate. Therefore, when continued to from the block 720, the block 780 may encompass the functions for the more traditional autofocus tools (e.g., the high accuracy autofocus tools 143fb of FIG. 2 and the full set of operations of the machine vision system 100.)

At a block 722, a fast approximate autofocus tool (or mode) is selected. At a block 730, a region of interest (ROI) for the representative feature is defined (e.g., by configuring a fast approximate autofocus tool widget in a GUI). At a block 740, a representative feature-specific focus curve for the region of interest (ROI) is determined and/or learned. The representative feature-specific focus curve corresponds to a plurality of images at respective Z height steps between the camera and the representative feature. A focus threshold value defining a sufficient level of focus for inspection operations is also determined and/or learned. At a block 750, fast approximate autofocus tool data is stored in association with a part program, the tool data including the representative feature-specific focus curve data and the focus threshold value data. At a block 780, feature inspection operations are defined. It will be appreciated that when the routine continues from the block 750 to the block 780, that in certain implementations the operation of the block 780 may be used to teach/learn inspection operations that would be performed in the approximately focused image that will be provided by the fast approximate autofocus tool during the run mode. In contrast, during the learn mode the fast approximate autofocus tool may automatically provide a focused image for the user to use for block 780 operations, in that it will have just recently performed operations to characterize the full focus curve, such that when it is complete it can make a movement to provide the best focused image. It will be appreciated that more complex versions of the fast approximate autofocus tool with additional potential learn mode operations may also be provided.

Returning to FIG. 7, at a decision block 790 a determination is made as to whether there are more features to be inspected. If there are more features to be inspected, then the routine returns to the block 714. If at decision block 790 it is determined that there are no more features to be inspected, then the routine continues to a block 795, where the part program is stored, which may optionally end the learn mode. It will be appreciated that certain of the steps of the routine 700 may be considered to expand the generic operations of the more general routine 500 of FIG. 5. More specifically, the routine 700 may, in certain embodiments be considered to implement and/or expand the generic operations of the routine 500 in the context of training a fast approximate focus video tool in learn mode, and places it in the context of training repeated instances of the tool, which in certain instances may be interspersed in learn mode with the training of other types of tools (e.g., as illustrated by the user decision required at the decision block 720, the user's selection of a fast approximate focus tool at the block 722, and the potential user operations at the block 730).

Figure 8A:
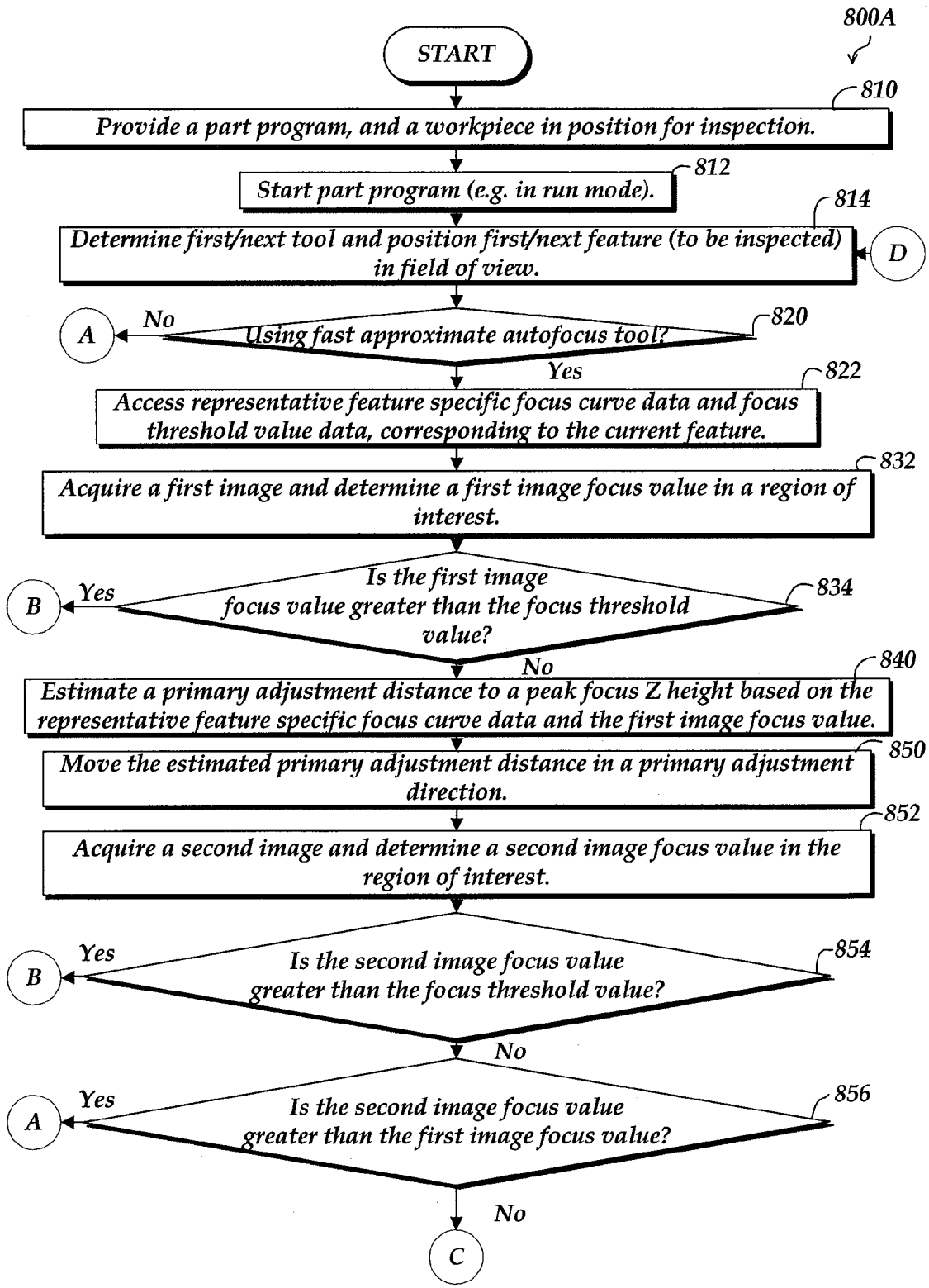
FIGS. 8A and 8B are flow diagrams illustrative of a routine for an augmented implementation of fast approximate focus operations during run mode.
Figure 8B:
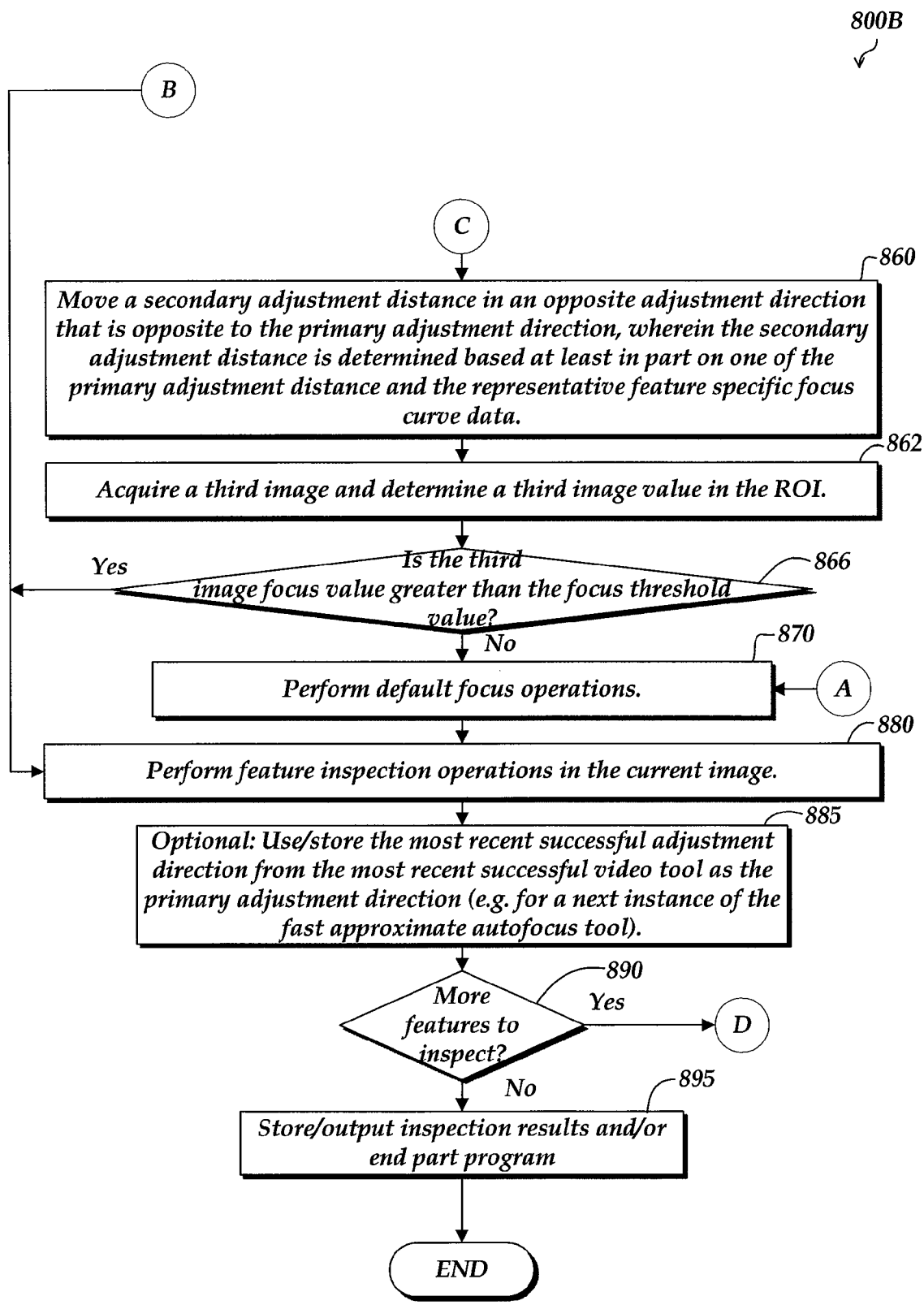

FIGS. 8A and 8B are flow diagrams illustrative of portions 800A and 800B of a routine 800 for an augmented implementation of fast approximate focus operations during run mode. It will be appreciated that the fast approximate focus run mode routine 800 may in certain embodiments be considered to be an augmented implementation of the more general fast approximate focus run mode routine 600 of FIG. 6. As shown in FIG. 8A, at a block 810 a part program, and a workpiece in position for inspection, are provided. At a block 812, the part program is started (e.g., in run mode). At a block 814, the first/next tool is determined (and/or configured, and/or defined) and the first/next feature (to be inspected) is positioned in field of view.

At a decision block 820, a determination is made as to whether the fast approximate autofocus tool is being used. If the fast approximate autofocus tool is being used, then the routine continues to a block 822, as will be described in more detail below. If at decision block 820 it is determined that the fast approximate autofocus tool is not being used, then the routine continues to a point A, which continues at a block 870 in FIG. 8B, as will be described in more detail below.

At a block 822, representative feature-specific focus curve data and focus threshold value data are accessed, corresponding to the current feature. At a block 832, a first image is acquired and a first image focus value is determined in the region of interest. At a decision block 834, a determination is made as to whether the first image focus value is greater than the focus threshold value. If the first image focus value is not greater than the focus threshold value, then the routine continues to a block 840, as will be described in more detail below. If at decision block 834 it is determined that the first image focus value is greater than the focus threshold value, then the routine continues to a point B, which continues at a block 880 in FIG. 8B, as will be described in more detail below.

At a block 840, a primary adjustment distance is estimated to a peak focus Z height, based on the representative feature-specific focus curve data and the first image focus value. At a block 850, the Z height is adjusted by moving the estimated primary adjustment distance in a primary adjustment direction. At a block 852, a second image is acquired and a second image focus value is determined in the region of interest.

At a decision block 854, a determination is made as to whether the second image focus value is greater than the focus threshold value. If the second image focus value is not greater than the focus threshold value, then the routine continues to a decision block 856, as will be described in more detail below. If at decision block 854 it is determined that the second image focus value is greater than the focus threshold value, then the routine continues to the point B, which continues at the block 880 in FIG. 8B, as will be described in more detail below.

At a decision block 856, a determination is made as to whether the second image focus value is greater than the first image focus value. If the second image focus value is not greater than the first image focus value, then the routine continues to a point C, which continues at a block 860 in FIG. 8B, as will be described in more detail below. If at decision block 856 it is determined that the second image focus value is greater than the first image focus value, then the routine continues to the point A, which continues at the block 870 in FIG. 8B, as will be described in more detail below.

As shown in FIG. 8B, at a block 860 (which continues from point C of FIG. 8A), the Z height is adjusted by moving an estimated secondary adjustment distance in a direction that is opposite to the primary adjustment direction, wherein the estimated secondary adjustment distance is determined based on at least one of the primary adjustment distance and the representative feature-specific focus curve data in combination with the second image focus value. At a block 862, a third image is acquired and a third image focus value is determined in the region of interest.

At a decision block 866, a determination is made as to whether the third image focus value is greater than the focus threshold value. If the third image focus value is not greater than the focus threshold value, then the routine continues to a block 870, as will be described in more detail below. If at decision block 866 it is determined that the third image focus value is greater than the focus threshold value, then the routine continues to a block 880, as will be described in more detail below. At a block 870, default focus operations (e.g., autofocus operations that determine a new focus curve during run mode) are performed. It will be appreciated that arrival at block 870 indicates that the preceding fast approximate focus operations failed to provide a sufficiently focused image. If the block 870 is reached repeatedly when determining a workpiece part program in learn mode, it may indicate that workpiece surface or features generally produce a "poorly behaved" focus curve (e.g., a significantly asymmetric focus curve, or a focus curve with a plurality of significant focus peaks throughout its Z range). In such cases use of the fast approximate focus operations may not be appropriate. At a block 880, feature inspection operations are performed in the current image. At an optional block 885, the most recent successful adjustment direction from the most recent successful fast approximate focus video tool is used/stored as the primary adjustment direction (e.g., for a next instance of the fast approximate autofocus tool).

At a decision block 890, a determination is made as to whether there are more features to inspect. If there are not more features to inspect, then the routine continues to a block 895, as will be described in more detail below. If at decision block 890 it is determined that there are more feature to inspect, then the routine continues to a point D, which continues at the block 814 in FIG. 8A, as described above. At a block 895, the inspection results are stored/output and/or the part program is ended.

It will be appreciated that the routine 800 of FIGS. 8A and 8B may in one embodiment be considered to be an augmented implementation of the routine 600 of FIG. 6. For example, in comparing block 656 of FIG. 6 with blocks 854 and 856 and the subsequent operations of FIGS. 8A and 8B, it will be appreciated that the block 656 assumes ideal conditions under which the run time focus curve and the representative focus curve (e.g., see FIG. 4) are substantially similar. In the ideal circumstance where the run time focus curve and representative focus curve are presumed to be substantially similar, the decision block 656 of FIG. 6 is sufficient in that there is little discrepancy between the two, such that there will typically not be a need to switch to default autofocus operations (e.g., such as those utilized by the high accuracy autofocus tools 143fb of FIG. 2). Such ideal circumstances may occur, for example, under conditions utilizing highly reproducible parts, consistent lighting, etc. In contrast, the decision blocks 854 and 856 and subsequent operations of FIGS. 8A and 8B illustrate a more robust augmented implementation suitable for potentially non-ideal conditions in which the focus curve and representative focus curve may be dissimilar. Thus, as described above, at the decision block 854 a determination is made as to whether the second image focus value is greater than the threshold focus value, which if it is not, then at the block 856 a determination is made as to whether the second image focus value is greater than the first image focus value. This is a combination of steps that may provide the best overall throughput, in that if the second image focus value is greater than the first image focus value, then it may be inferred that the Z height adjustment was made in the correct direction, but failed to provide the expected amount of improvement in the resulting image focus. From this, it may be inferred that the run mode conditions do not sufficient match the learn mode conditions, such that the learn mode and run mode focus curves are significantly different and the fast approximate focus operations are not likely to provide a sufficiently focused image, in which case the routine proceeds to block 870, where default focus operations are performed (e.g., such as those of the high accuracy autofocus tools 143fb of FIG. 2.) Conversely, if at decision block 856 it is determined that the second image focus value is not greater than the first image focus value, then it may be inferred that the Z height adjustment was made in the direction. This is one of the possible intermediate outcomes that is expected in the fast approximate focus operations, therefore operation continues with a normal fast approximate focus adjustment performed at the block 860.

Figure 9A:
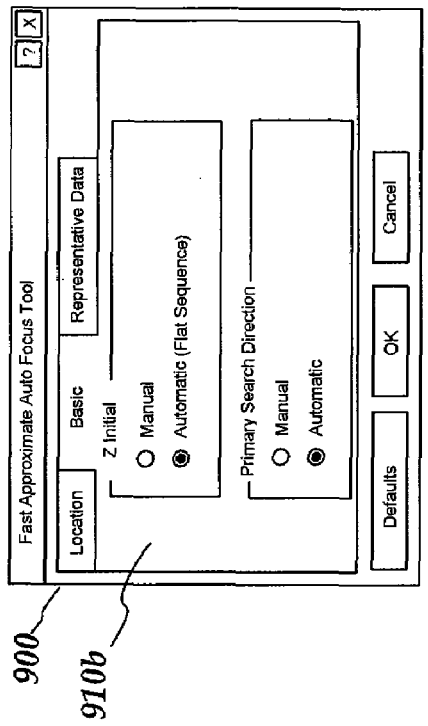
FIGS. 9A-9C are diagrams illustrating various features of one embodiment of a fast approximate autofocus tool user interface including a tool parameter editing dialog box.
Figure 9B:
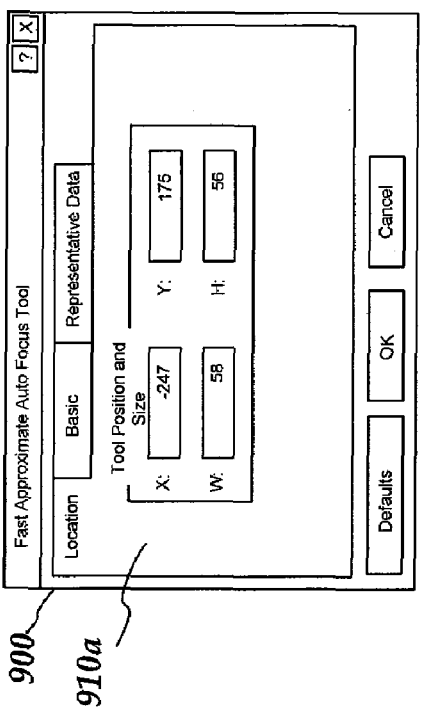
Figure 9C:
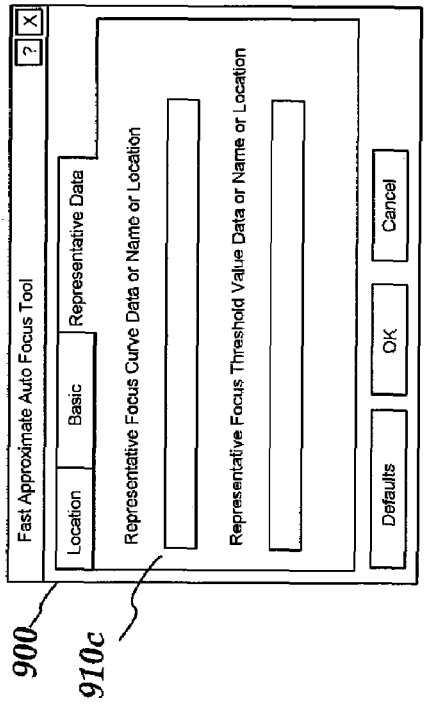

FIGS. 9A-9C are diagrams illustrating various features of one embodiment of a fast approximate autofocus tool user interface including a fast approximate autofocus tool parameter dialog box 900. In one embodiment, a tabbed dialog box configuration may be used, such as the autofocus parameter dialog box 900, which includes user-selectable tabbed portions 910a, 910b and 910c. FIG. 9A illustrates the tabbed portion 910a, which is for "location" selections and which reflects the X and Y center coordinates, as well as the width (W) and height (H) of the fast approximate autofocus tool ROI. These values may be determined by graphical definition of a region of interest for a workpiece feature to be inspected, and/or they may be entered directly in the dialog box.

FIG. 9B illustrates the tabbed portion 910b, which is for "basic" selections and which reflects the desired method of determining the initial Z height ("Z initial") that is to be used for acquiring the first image during the fast approximate focus tool operations, and also reflects the desired method of determining the primary adjustment direction during run mode fast approximate focus tool operations. For the Z initial, a user is provided with an option of selecting "manual" or "automatic (flat sequence)." Regarding the "automatic" selection, as described above with reference to FIGS. 3 and 4, when performing fast approximate focus operations for a sequence of workpiece features along an approximately flat surface, the fast approximate focus tool operations may implement an automatic adaptive procedure for determining Z initial. In one embodiment, during run mode when a current instance of a fast approximate focus tool follows a preceding fast approximate focus tool, the initial Z height used for the first image of such a tool may be set adaptively, based on the latest previous "successful" Z height that provided a sufficiently focused image. Selecting the "automatic (flat sequence)" setting may activate such a procedure for the associated fast approximate focus tool(s). In one embodiment the initial Z height may be set equal to the latest successful Z height. In another embodiment the initial Z height may be adaptively set equal to the latest successful Z height plus an adaptively determined additional increment of distance in the direction of the last successful adjustment direction (e.g., based on a slope indicated by a plurality of previous successful Z heights). The automatic (flat sequence) selection is in certain embodiments generally considered to be most effective when a series of features to be inspected are approximately coplanar on a workpiece surface.

When the "manual" selection is made for Z initial, this may implement a procedure wherein during run mode the initial Z height used for the first image of a current instance of a fast approximate focus tool is the Z height that was used when training that tool during learn mode. In certain embodiments, this type of manual operation may be considered to be most effective in circumstances where there are relatively few isolated features to be inspected, or where the types of workpieces being inspected tend to have features distributed on a plurality of surfaces of different heights, such that it may be best to have the initial Z heights follow the Z heights that were established during the learn mode. Typically, the Z heights in such instances may be established during the learn mode by the user setting the Z height, or by setting it based on CAD data, etc.

The tabbed portion 910b also allows the user to select a desired method for determining the primary adjustment direction used during the run mode fast approximate focus tool operations—either "manual" or "automatic." In one embodiment, as described above with respect to FIGS. 3 and 4, for an "automatic" selection, the last previous successful move direction from a previous instance of a fast approximate focus tool may be utilized as the primary adjustment direction for a subsequent instance of a fast approximate focus tool. In contrast, for a "manual" selection, the primary adjustment direction is whatever the user enters as the primary adjustment direction during learn mode. For example, if a user selects "manual," in one embodiment another pop-up box may be provided which allows a user to select a direction such as "search up" or "search down." These types of options may be useful in circumstances where the machine vision system is operating very close to an irregular surface, such that it may be desirable to avoid searching toward the surface initially, lest the camera crash into the workpiece.

FIG. 9C illustrates the tabbed portion 910c, which is for the "representative data" selections, and which reflect or identifies the representative focus curve and the representative focus threshold value that are to be used with a corresponding instance of a fast approximate focus tool during run mode. As disclosed previously, the fast approximate autofocus tool utilizes preexisting data or learned data during run mode, as opposed to real time focus curve data. For the "representative focus curve data, name or location," a box is provided in which entries may be made that define the representative focus curve data that is used during run mode. In various embodiments, the data itself may be entered, (e.g., in the form of raw focus curve data points, or a set of coefficients for defining a curve fit to raw focus curve data points); or the entry may be a variable string name, or file name, or memory address location, or external subroutine identifier, or the like, where the data is stored or characterized such that it may be recalled by the corresponding instance of the fast approximate focus tool during run mode. In one embodiment, the data may be automatically entered in the box during learn mode, and a user may review the data in the box (e.g., to make a decision as to whether to use the existing data, or to override it with generic values, or to rename the data storage location or the like).

It should be appreciated the various user interface features and selectable operation features outlined above are exemplary only, and not limiting. For example, in various embodiments the representative focus curve data and the representative focus threshold value data may be stored directly in a part program and the tabbed portion 910c would be omitted. More generally, various optional features may be omitted from the video tool and their corresponding user interface features may therefore also be omitted. Furthermore, it is apparent that the graphical form and menu hierarchy related to the user interface of a fast approximate autofocus tool may take different forms in other embodiments.

The tabbed portion 901c also allows the user to review or enter the data for the "representative focus threshold value data, name or location" that corresponds to the representative focus curve data identified on the same tab and the same corresponding instance of a fast approximate focus tool. As described above with respect to FIGS. 3 and 4 and elsewhere, the focus threshold value (or data that defines the focus threshold value) is typically established during learn mode, and is used during run mode to determine whether an image focus value indicates that the corresponding image provides sufficient focus to support workpiece feature inspection operations. Similar to the "representative focus curve data or name or location," in various embodiments the "representative focus threshold value data, name or location" may define the representative focus threshold value data in any of several formats (e.g., a numerical value, a file name, a file name for a subroutine that computes the desired values based on the focus group data, etc). In one embodiment, the data may be automatically entered in the box during learn mode, and a user may review the data in the box (e.g., to make a decision as to whether to use the existing data, or to override it with another value, or to rename the data storage location or the like.

For all of the tabbed portions 910a-910c, the "Defaults" button at the bottom restores the entries (e.g., the manual or automatic selections on the tabbed portion 910b) to their default values, the "OK" button accepts the current parameters and closes the autofocus parameter dialog box 900, and the "Cancel" button returns all parameters to their state before the current editing sequence began and closes the dialog box 900.

Another type of mode or routine included in or related to learn mode fast approximate focus operations may provide an "ease of use" feature that is useful for inexperienced users, and could have parameters indicated on a tabbed portion (not shown). The mode or subroutine involves some automatic evaluation of certain sequences of inspection operations using fast approximate focus tools during learn mode. In one embodiment, tool mode or subroutine may evaluate a plurality of previously trained fast approximate focus tools to determine whether it is likely that the workpiece surface where feature inspection operations are currently being defined is nominally planar (e.g., by evaluating whether the previously trained fast approximate focus tools all include initial Z heights that fall within a relatively narrow range, or some other appropriate method). If so, then the tool mode or subroutine may notify the user that, in effect, it may be appropriate to implement one or both of the "automatic" settings previously described with reference to the "Basic" tab 910b, if the setting are not already appropriate. Conversely, if the evaluation of previously trained Z initial heights indicates significant height variations, then the tool mode or subroutine may notify the user that, in effect, it may be appropriate to implement one or both of the "manual" settings previously described with reference to the "Basic" tab 910b, if the settings are not already appropriate. Such a mode or routine included in learn mode fast approximate focus operations may help users that are only familiar with conventional autofocus operations create more robust and/or faster part programs by using the fast approximate focus tool appropriately.

Figure 10:
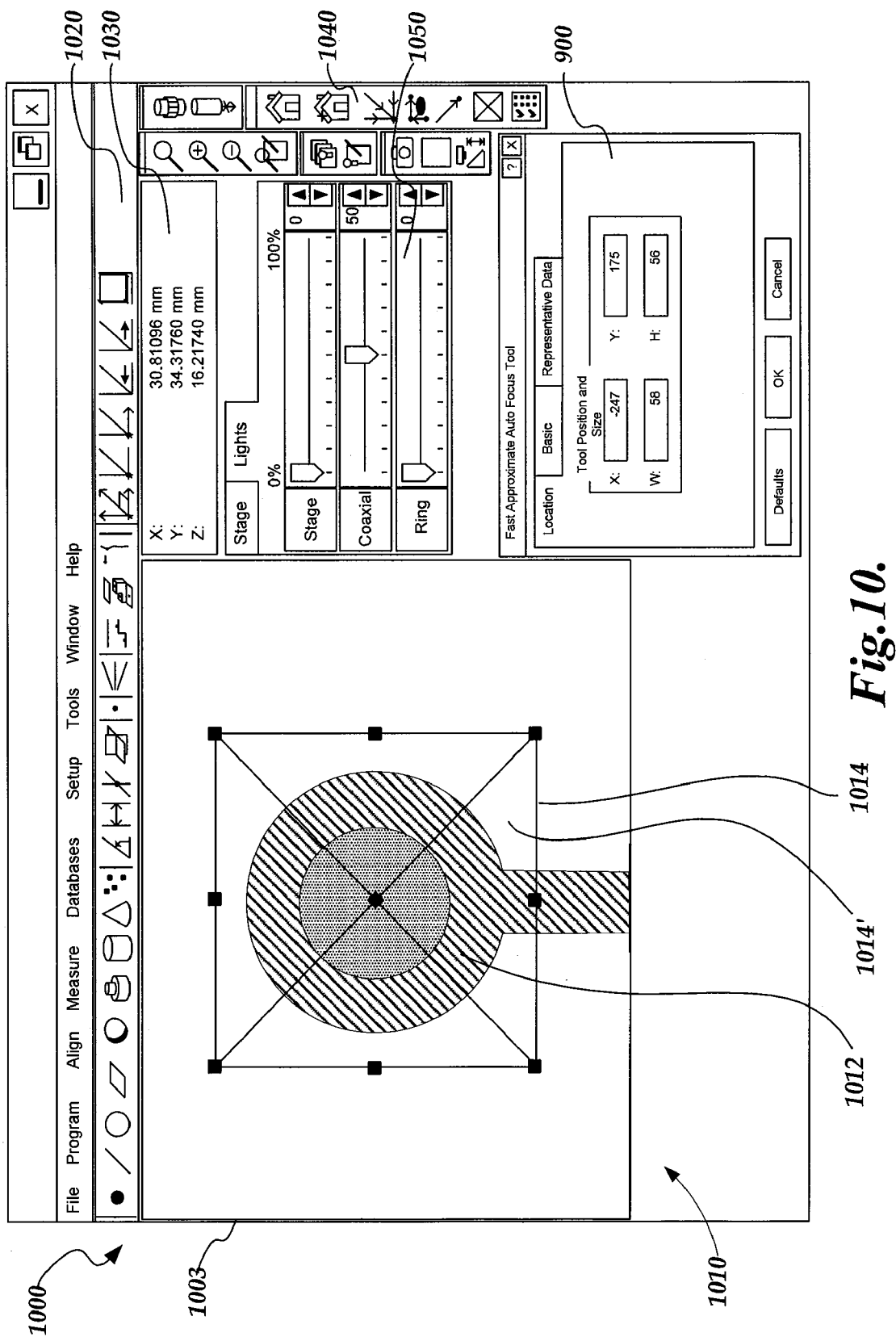
FIG. 10 is a diagram illustrating one embodiment of a machine vision inspection system user interface display including various features associated with a fast approximate autofocus tool.

FIG. 10 is a diagram illustrating one embodiment of a machine vision inspection system user interface display 1000 including an arrangement of various features associated with a fast approximate autofocus tool. In the exemplary state shown in FIG. 10, the user interface display 1000 includes a field of view window 1003 that displays a workpiece image 1010. The user interface 1000 also include various measurement and/or operation selection bars such as the selection bars 1020 and 1040, a real-time X-Y-Z (position) coordinate window 1030, and a light control window 1050.

The field of view window 1003 includes an exemplary fast approximate autofocus widget 1014 and region of interest 1014' superimposed upon a current workpiece feature 1012 to be inspected. In various embodiments, when the user selects a fast approximate autofocus tool or mode (e.g., from a selection bar that displays various alternative tool and/or mode selection buttons), the user interface may automatically display an autofocus parameter dialog box, such as the previously described parameter dialog box 900 as shown in FIG. 9. In one embodiment, the widget 1014 may be automatically displayed in the user interface to allow a user to graphically define the region of interest 1014' for that instance of the fast approximate focus tool (e.g., by dragging the square handles located on the border of the widget 1014 using a computer mouse and screen cursor). It will be appreciated that in certain embodiments the workpiece feature 1012 and the fast approximate autofocus region of interest widget 1014 and region of interest 1014' appear and operate similarly to the fast approximate autofocus regions of interest 314A-314D of FIG. 3.

It will be appreciated that by utilizing the methods of the present invention, significant throughput improvement for autofocusing operations may be achieved. In certain embodiments and applications, the fast approximate focusing operations of the present invention increase throughput by approximately 2.5 to 15 times compared to more conventional autofocusing procedures that determine focus curves in run mode. In general, the improvement in throughput depends on which conventional autofocusing modes of operation are being used for comparison (e.g., whether a low, medium, or high density of focus curve points used for determining the conventional run mode focus curves) and on sequences of successive focus operations that are used in the part program, and that can appropriately use fast approximate autofocus operations, are long sequences or short sequences. The throughput increase is greater for longer sequences, which occur on a wide variety of relatively planar or flat parts.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. In a machine vision inspection system, a method for focusing to provide an inspection image, the method comprising:
during a run mode of the machine vision inspection system, automatically approximately focusing an inspection image using a set of operations comprising:
acquiring a first image of a current region of interest including a feature to be inspected and determining a first image focus value that is indicative of a first focus in the current region of interest;
accessing previously learned representative feature-specific focus curve data and focus threshold value data corresponding to the current region of interest; and
evaluating the first image focus value to determine if the first focus indicated by the first image focus value is less focused than a threshold focus indicated by a focus threshold value and, when the first focus is less focused than the threshold focus, performing a subset of operations comprising:
moving a focusing element that is one of (a) the feature to be inspected and (b) a focus determining optical element, along a primary adjustment direction for an estimated primary adjustment distance, wherein the primary adjustment distance is estimated based on the representative feature-specific focus curve data and the first image focus value;
acquiring a second image of the current region of interest after moving the focusing element the estimated primary adjustment distance, and determining a second image focus value that is indicative of a second focus in the region of interest in the second image; and
evaluating the second image focus value to determine if the second focus is less focused than a focus indicated by a previously determined focus value parameter and, when the second focus is less focused than the focus indicated by the previously determined focus value parameter, moving the focusing element along a secondary adjustment direction that is opposite to the primary adjustment direction for an estimated secondary adjustment distance that is an estimated distance to a best focus position based at least in part on one of (c) the primary adjustment distance and (d) the representative feature-specific focus curve data.

2. The method of claim 1, wherein when the first focus is more focused than the threshold focus, then it is determined that the first image is approximately focused and the first image is used as the inspection image, and performance of the subset of operations comprising moving, acquiring, and evaluating is not necessary.

3. The method of claim 1, wherein when the second focus is less focused than the focus indicated by the previously determined focus value parameter, the subset of operations further comprises:
acquiring a third image of the current region of interest after moving the focusing element the secondary adjustment distance; and
determining a third image focus value that is indicative of a third focus in the region of interest in the third image.

4. The method of claim 3, wherein the subset of operations further comprises evaluating the third image focus value to determine if the third focus is less focused than the focus indicated by the previously determined focus value parameter and, when the third focus is less focused than the focus indicated by the previously determined focus value parameter, defaulting to perform autofocusing operations that include determining a run mode focus curve for the current region of interest.

5. The method of claim 4, wherein the previously determined focus value parameter is the focus threshold value, and if the third focus is more focused than the threshold focus indicated by the focus threshold value, then it is determined that the third image is approximately focused and the third image is used as the inspection image.

6. The method of claim 3, wherein if the second focus is more focused than the focus indicated by the previously determined focus value parameter, then it is determined that the second image is approximately focused and the second image is used as the inspection image, and the operations of acquiring a third image and determining a third image focus value are not necessary.

7. The method of claim 1, wherein after moving the focusing element along the primary adjustment direction and along the secondary adjustment direction that is opposite to the primary adjustment direction, no additional movements of the focusing element are made with the objective of automatically approximately focusing an image of the current region of interest.

8. The method of claim 1, wherein the previously determined focus value parameter that the second image focus value is compared to is the first image focus value.

9. The method of claim 1, wherein the previously determined focus value parameter that the second image focus value is compared to is the focus threshold value.

10. The method of claim 1, wherein the primary adjustment direction is selected to be the same direction as a last successful adjustment direction that provided an approximately focused image that was used as an inspection image during a previously run instance of a set of operations for automatically approximately focusing an inspection image.

11. The method of claim 1, wherein the estimated secondary adjustment distance is nominally two times the estimated primary adjustment distance.

12. The method of claim 1, wherein the method is performed based, at least in part, on operations established by operating a video tool included in the machine vision inspection system.

13. The method of claim 12, further comprising selecting and training the video tool in a user-operated learn mode to determine and store the learned representative feature-specific focus curve data and focus threshold value data corresponding to the current region of interest.

14. The method of claim 1, wherein focus values included in the previously learned representative feature-specific focus curve data, the focus threshold value data, the first image focus value, and the second image focus value are normalized focus values.

15. The method of claim 1, wherein the focus threshold value corresponds to a point on a focus curve of the representative feature-specific focus curve data, and that point is determined such that it is not less than 2 and not more than 7 depths of field away from the peak focus position of the focus curve, wherein the depth of field is that of an optical system of the machine vision system that is used to acquire images within the set of operations of the method.

16. The method of claim 1, wherein the estimated secondary adjustment distance is estimated based on the representative feature-specific focus curve data and the second image focus value.

17. A computer readable medium containing computer executable instructions which, when executed on a machine vision system, cause the machine vision system to perform a method of focusing to provide an inspection image, the method comprising:

during a run mode of the machine vision inspection system, automatically approximately focusing an inspection image using a set of operations comprising:
acquiring a first image of a current region of interest including a feature to be inspected and determining a first image focus value that is indicative of a first focus in the current region of interest;
accessing previously learned representative feature-specific focus curve data and focus threshold value data corresponding to the current region of interest; and
evaluating the first image focus value to determine if the first focus indicated by the first image focus value is less focused than a threshold focus indicated by a focus threshold value and, when the first focus is less focused than the threshold focus, performing a subset of operations comprising:
moving a focusing element that is one of (a) the feature to be inspected and (b) a focus determining optical element, along a primary adjustment direction for an estimated primary adjustment distance, wherein the primary adjustment distance is estimated based on the representative feature-specific focus curve data and the first image focus value;
acquiring a second image of the current region of interest after moving the focusing element the estimated primary adjustment distance, and determining a second image focus value that is indicative of a second focus in the region of interest in the second image; and
evaluating the second image focus value to determine if the second focus is less focused than a focus indicated by a previously determined focus value parameter and, when the second focus is less focused than the focus indicated by the previously determined focus value parameter, moving the focusing element along a secondary adjustment direction that is opposite to the primary adjustment direction for an estimated secondary adjustment distance that is an estimated distance to a best focus position based at least in part on one of (c) the primary adjustment distance and (d) the representative feature-specific focus curve data.

18. The computer readable medium of claim 17, wherein the previously determined focus value parameter is the focus threshold value and when the second focus is less focused than the threshold focus indicated by the focus threshold value, the subset of operations further comprises:
acquiring a third image of the current region of interest after moving the focusing element the secondary adjustment distance;
determining a third image focus value that is indicative of a third focus in the region of interest in the third image;
evaluating the third image focus value to determine if the third focus is less focused than the threshold focus indicated by the focus threshold value, and
when the third focus is less focused than the threshold focus indicated by the focus threshold value, defaulting to perform autofocusing operations that include determining a run mode focus curve for the current region of interest, and
when the third focus is more focused than the threshold focus indicated by the focus threshold value, then it is determined that the third image is approximately focused and the third image is used as the inspection image.

19. The computer readable medium of claim 17, wherein the method further comprises that after moving the focusing element along the primary adjustment direction and along the secondary adjustment direction that is opposite to the primary adjustment direction, no additional movements of the focusing element are made with the objective of automatically approximately focusing an image of the current region of interest.

20. The computer readable medium of claim 17, wherein the method further comprises that the primary adjustment direction is selected to be the same direction as a last successful adjustment direction that provided an approximately focused image that was used as an inspection image during a previously run instance of a set of operations for automatically approximately focusing an inspection image.

* * * * *